United States Patent
Yoshino et al.

(10) Patent No.: US 12,480,207 B2
(45) Date of Patent: Nov. 25, 2025

(54) TIN COMPOUND, THIN-FILM FORMING RAW MATERIAL, THIN-FILM, METHOD FOR PRODUCING THIN-FILM, AND HALOGEN COMPOUND

(71) Applicant: ADEKA CORPORATION, Tokyo (JP)

(72) Inventors: Tomoharu Yoshino, Tokyo (JP); Atsushi Yamashita, Tokyo (JP); Yoshiki Ooe, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 112 days.

(21) Appl. No.: 18/282,130

(22) PCT Filed: Mar. 9, 2022

(86) PCT No.: PCT/JP2022/010299
§ 371 (c)(1),
(2) Date: Sep. 14, 2023

(87) PCT Pub. No.: WO2022/196491
PCT Pub. Date: Sep. 22, 2022

(65) Prior Publication Data
US 2024/0167155 A1 May 23, 2024

(30) Foreign Application Priority Data
Mar. 18, 2021 (JP) ................. 2021-044375

(51) Int. Cl.
*C23C 16/455* (2006.01)
*C07F 7/22* (2006.01)
(Continued)

(52) U.S. Cl.
CPC ...... *C23C 16/45553* (2013.01); *C07F 7/2284* (2013.01); *C23C 16/407* (2013.01); *C23C 16/4485* (2013.01)

(58) Field of Classification Search
None
See application file for complete search history.

(56) References Cited

U.S. PATENT DOCUMENTS

2006/0141155 A1  6/2006  Gordon et al.
2008/0003359 A1  1/2008  Gordon et al.
(Continued)

FOREIGN PATENT DOCUMENTS

JP  2009-542654 A  12/2009
JP  2012-514635 A   6/2012
(Continued)

OTHER PUBLICATIONS

Ahmet et al., "Tin guanidinato complexes: oxidative control of Sn, SnS, SnSe and SnTe thin film deposition", 2018, Dalton Transactions, vol. 47, p. 5031-5048 (Year: 2018).*
(Continued)

*Primary Examiner* — Shamim Ahmed
*Assistant Examiner* — Bradford M Gates
(74) *Attorney, Agent, or Firm* — GREENBLUM & BERNSTEIN, P.L.C.

(57) ABSTRACT

Provided is a tin compound, which is represented by the following general formula (1):

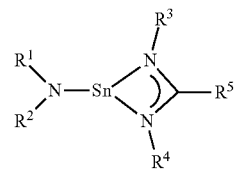

(1)

in the formula (1), $R^1$ and $R^2$ each independently represent an alkyl group having 1 to 5 carbon atoms or an
(Continued)

alkylsilyl group having 3 to 12 carbon atoms, $R^3$ and $R^4$ each independently represent an alkyl group having 1 to 5 carbon atoms, and $R^5$ represents a hydrogen atom or an alkyl group having 1 to 5 carbon atoms.

6 Claims, 4 Drawing Sheets

(51) Int. Cl.
  *C23C 16/40* (2006.01)
  *C23C 16/448* (2006.01)

(56) References Cited

U.S. PATENT DOCUMENTS

| | | |
|---|---|---|
| 2009/0291208 A1 | 11/2009 | Gordon et al. |
| 2010/0092667 A1 | 4/2010 | Gordon et al. |
| 2011/0151615 A1 | 6/2011 | Gordon et al. |
| 2011/0268881 A1 | 11/2011 | Jung et al. |
| 2016/0115328 A1 | 4/2016 | Gordon |
| 2021/0285103 A1 | 9/2021 | Park et al. |

FOREIGN PATENT DOCUMENTS

| | | |
|---|---|---|
| JP | 2016-526106 A | 9/2016 |
| WO | 2008/002546 A1 | 1/2008 |
| WO | 2010/079979 A2 | 7/2010 |
| WO | 2014/197801 A1 | 12/2014 |
| WO | 2018/062590 A1 | 4/2018 |

OTHER PUBLICATIONS

Ibrahim Y. Ahmer et al., "Tin guanidinato complexes: oxidative controlof Sn, SnS, SnSe and SnTe thin film deposition", Dalton Transactions, 2018, vol. 47, pp. 5031-5048.

Lucia Alvarez-Rodriguez et al., "Organic Amides as Suitable Precursorsto Stabilize Stannylenes", American Chemical Society, 2013, vol. 32, pp. 3557-3561.

Alexandre Sodreau et al., "Symmetricand non-symmetric bis-metallylene iron complexes, precursors of iron germanide nanoparticles", Chem Commun., 2019, vol. 55, pp. 9539-9542.

International Search Report issued May 24, 2022 in International Bureau of WIPO Patent Application No. PCT/JP2022/010299 with an English translation thereof.

Written Opinion issued May 24, 2022 in International Bureau of WIPO Patent Application No. PCT/JP2022/010299 with an English translation thereof.

\* cited by examiner

TIN COMPOUND, THIN-FILM FORMING RAW MATERIAL, THIN-FILM, METHOD FOR PRODUCING THIN-FILM, AND HALOGEN COMPOUND

TECHNICAL FIELD

The present invention relates to a tin compound, a thin-film forming raw material including the tin compound, a thin-film obtained by using the thin-film forming raw material, a method of producing a thin-film, and a halogen compound.

BACKGROUND ART

A thin-film material containing a metal element or silicon has been used in, for example, a member for an electronic part, such as an electrode film, a resistance film, or a barrier film, a member for a recording medium such as a magnetic film, or an electrode member for a solar cell thin-film or the like because of its excellent electrical characteristics and optical characteristics.

As a method of producing the thin-film, there are given, for example, a sputtering method, an ion plating method, a metal organic decomposition (MOD) method, such as a coating thermal decomposition method or a sol-gel method, and a chemical vapor deposition (CVD) method. Of those, a chemical vapor deposition method including an atomic layer deposition (ALD) method is an optimum production process because the method has many advantages, such as excellent composition controllability and step coverage, suitability for mass production, and capability of hybrid integration.

Various compounds have been reported as tin compounds to be used in the chemical vapor deposition method. For example, in Patent Document 1, there is a disclosure of tetrakis(N,N'-dimethylacetamidinato)tin(IV). In addition, in Patent Document 2, there is a disclosure of bis(N,N'-diisopropylacetamidinato)tin(II).

CITATION LIST

Patent Document

Patent Document 1: JP 2009-542654 A
Patent Document 2: JP 2016-526106 A

SUMMARY OF INVENTION

Technical Problem

In a method of forming a thin-film through the vaporization of a compound such as the CVD method, an important property that the compound (precursor) to be used as a thin-film forming raw material is required to have is as follows: the compound enables high-productivity production of a high-quality thin-film. However, the related-art tin compound has not sufficiently satisfied that point.

Accordingly, an object of the present invention is to provide a novel tin compound, which has a large vapor pressure and a low melting point, and enables high-productivity production of a high-quality thin-film when used as a thin-film forming raw material as compared to the related-art tin compound.

Solution to Problem

The inventors of the present invention have made investigations, and have found that the above-mentioned problems can be solved by a tin compound having a specific structure, to reach the present invention.

That is, the present invention is a tin compound, which is represented by the following general formula (1):

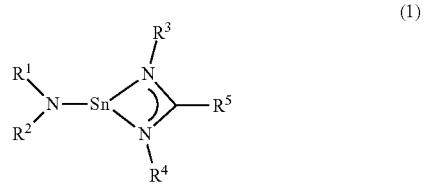

in the formula (1), $R^1$ and $R^2$ each independently represent an alkyl group having 1 to 5 carbon atoms or an alkylsilyl group having 3 to 12 carbon atoms, $R^3$ and $R^4$ each independently represent an alkyl group having 1 to 5 carbon atoms, and $R^5$ represents a hydrogen atom or an alkyl group having 1 to 5 carbon atoms.

The present invention is a thin-film forming raw material, including the tin compound.

The present invention is a thin-film, which is obtained by using the thin-film forming raw material.

The present invention is a method of producing a thin-film, including forming a thin-film containing a tin atom on a surface of a substrate through use of a raw material gas obtained by vaporizing the thin-film forming raw material.

The present invention is a halogen compound, which is represented by the following general formula (2):

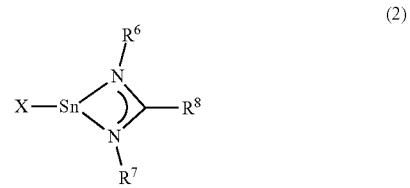

in the formula (2), X represents a halogen atom, $R^6$ and $R^7$ each independently represent an alkyl group having 1 to 5 carbon atoms, and $R^8$ represents a hydrogen atom or an alkyl group having 1 to 3 carbon atoms.

Advantageous Effects of Invention

According to the present invention, the tin compound, which has a high vapor pressure and a low melting point, and enables high-productivity production of a high-quality thin-film when used as a thin-film forming raw material as compared to the related-art tin compound, can be provided. The tin compound of the present invention is suitable as a thin-film forming raw material for a CVD method. In particular, the tin compound is excellent as a thin-film forming raw material for an ALD method.

DESCRIPTION OF EMBODIMENTS

Figure 1:
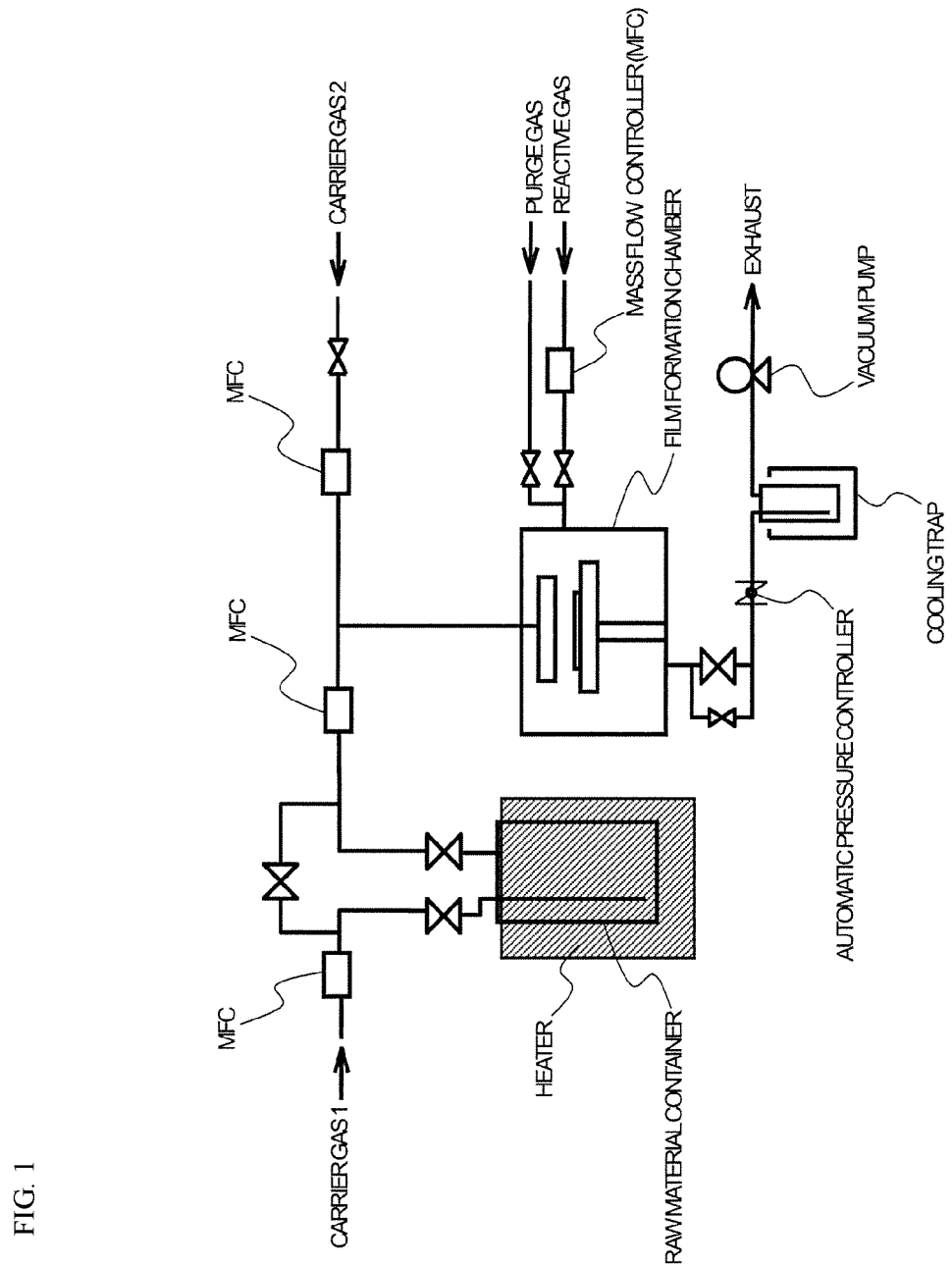
FIG. 1 is a schematic diagram for illustrating an example of an ALD apparatus to be used in a method of producing a thin-film according to the present invention.

A tin compound of the present invention is represented by the general formula (1), and is suitable as a precursor in a method of producing a thin-film including a vaporization step such as an ALD method, which is one kind of CVD method.

A tin compound represented by the following general formula (3) is identical in meaning to the tin compound represented by the general formula (1).

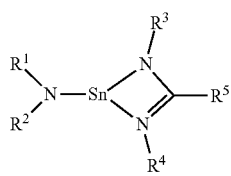
(3)

In the general formulae (1) and (3), $R^1$ and $R^2$ each independently represent an alkyl group having 1 to 5 carbon atoms or an alkylsilyl group having 3 to 12 carbon atoms, $R^3$ and $R^4$ each independently represent an alkyl group having 1 to 5 carbon atoms, and $R^5$ represents a hydrogen atom or an alkyl group having 1 to 5 carbon atoms.

Examples of the "alkyl group having 1 to 5 carbon atoms" include a methyl group, an ethyl group, a propyl group, an isopropyl group, a butyl group, an isobutyl group, a sec-butyl group, a tert-butyl group, a pentyl group, an isopentyl group, and a neopentyl group.

Examples of the "alkylsilyl group having 3 to 12 carbon atoms" include a trimethylsilyl group, a triethylsilyl group, a tripropylsilyl group, a triisopropylsilyl group, a tributylsilyl group, a tri-tert-butylsilyl group, a dimethylethylsilyl group, a dimethylpropylsilyl group, a dimethylisopropylsilyl group, a butyldimethylsilyl group, a tert-butyldimethylsilyl group, a pentyldimethylsilyl group, and a hexyldimethylsilyl group.

In the general formulae (1) and (3), $R^1$ to $R^5$ are each appropriately selected in accordance with a method of producing a thin-film to which the tin compound is applied. When the tin compound is used in a method of producing a thin-film including the step of vaporizing the tin compound, it is preferred to select $R^1$ to $R^5$ so that the tin compound has a large vapor pressure and a low melting point.

From the viewpoint that the tin compound has a large vapor pressure, and enables high-productivity production of a high-quality thin-film when used as a thin-film forming raw material, $R^1$ and $R^2$ each independently represent preferably an alkyl group having 1 to 5 carbon atoms, more preferably an alkyl group having 1 to 4 carbon atoms, particularly preferably an alkyl group having 1 to 3 carbon atoms. Although $R^1$ and $R^2$ may each represent any one of a linear alkyl group, such as a propyl group or a butyl group, or a branched alkyl group, such as an isopropyl group, an isobutyl group, a sec-butyl group, or a tert-butyl group, $R^1$ and $R^2$ each represent preferably a branched alkyl group, more preferably an isopropyl group, an isobutyl group, a sec-butyl group, or a tert-butyl group, particularly preferably an isopropyl group from the viewpoint that the thermal stability of the compound is improved. Although $R^1$ and $R^2$ may be identical to or different from each other, $R^1$ and $R^2$ preferably represent the same group from the viewpoint that the thermal stability is improved.

From the viewpoint that the tin compound has high thermal stability, and enables high-productivity production of a high-quality thin-film when used as a thin-film forming raw material, $R^3$ and $R^4$ each independently represent preferably an alkyl group having 3 to 5 carbon atoms, more preferably a branched alkyl group having 3 to 5 carbon atoms, particularly preferably an isopropyl group or a tert-butyl group, most preferably a tert-butyl group. Although $R^3$ and $R^4$ may be identical to or different from each other, $R^3$ and $R^4$ preferably represent the same group from the viewpoint that the thermal stability is improved. From the viewpoint that the compound has high thermal stability and a large vapor pressure, $R^5$ represents preferably a hydrogen atom or an alkyl group having 1 to 3 carbon atoms, more preferably a methyl group or an ethyl group, particularly preferably a methyl group.

In addition, when the tin compound is used in a method of producing a thin-film by a MOD method free of any vaporization step, $R^1$ to $R^5$ only need to be selected in accordance with, for example, solubility in a solvent to be used and a thin-film formation reaction.

Preferred specific examples of the tin compound represented by the general formula (1) include Tin Compounds No. 1 to No. 120 below. In Tin Compounds No. 1 to No. 120 below, "Me" represents a methyl group, "Et" represents an ethyl group, "nPr" represents a n-propyl group, "iPr" represents an isopropyl group, "iBu" represents an isobutyl group, "sBu" represents a sec-butyl group, "tBu" represents a tert-butyl group, "TMS" represents a trimethylsilyl group, and "tAm" represents a group represented by the following formula.

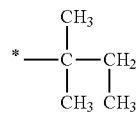

* represents a bonding site.

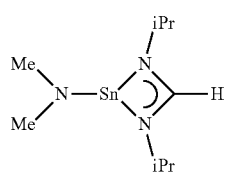
No. 1

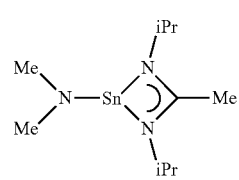
No. 2

No. 3
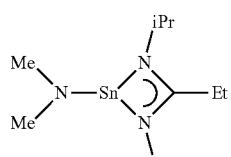
No. 4
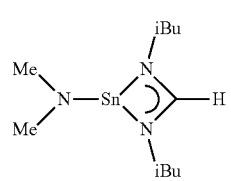
No. 5
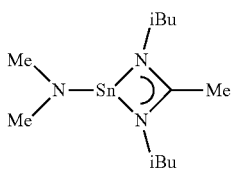
No. 6
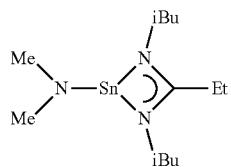
No. 7
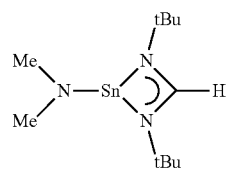
No. 8
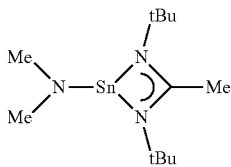
No. 9
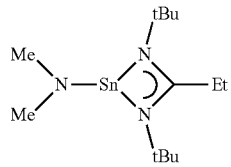
No. 10
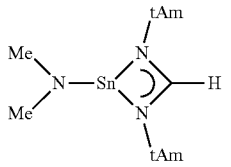
No. 11
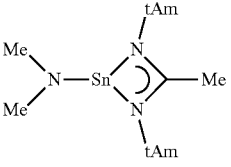
No. 12
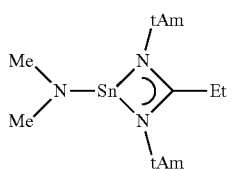
No. 13
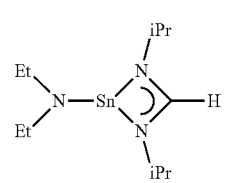
No. 14
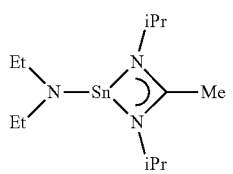
No. 15
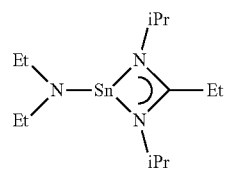
No. 16
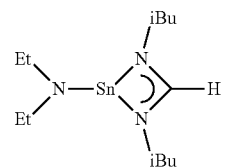
No. 17
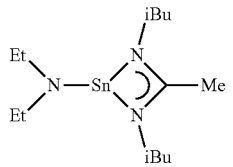
No. 18
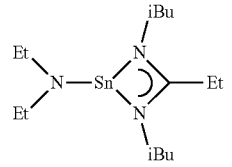
No. 19
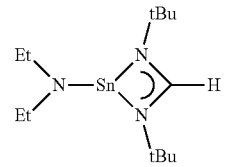
No. 20
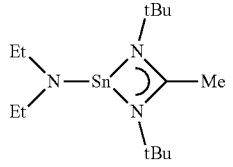

No. 21 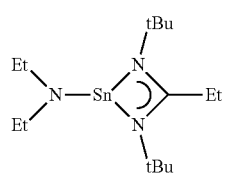
No. 22 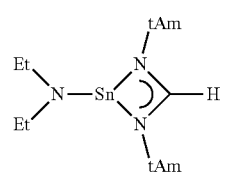
No. 23 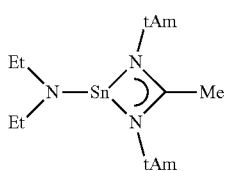
No. 24 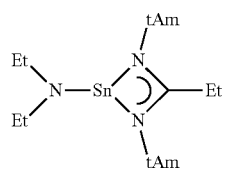
No. 25 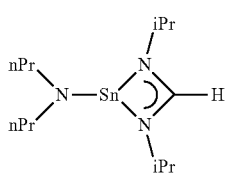
No. 26 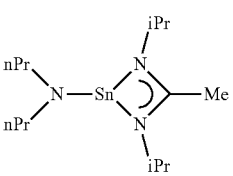
No. 27 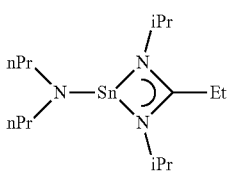
No. 28 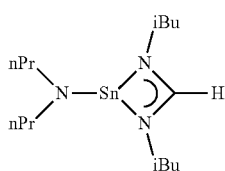
No. 29 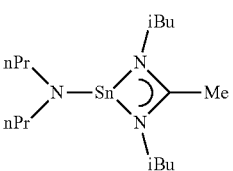
No. 30 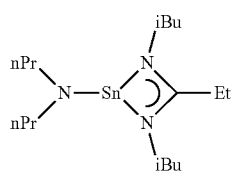
No. 31 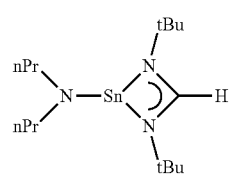
No. 32 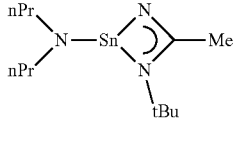
No. 33 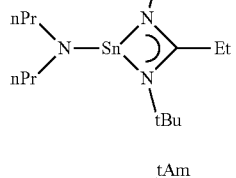
No. 34 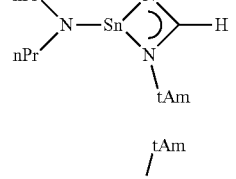
No. 35 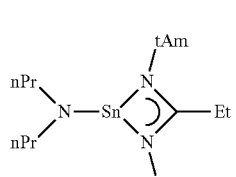
No. 36 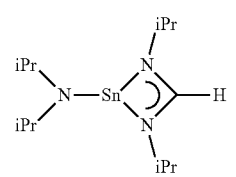
No. 37 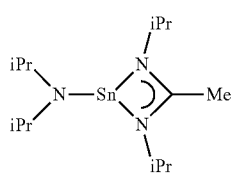
No. 38

-continued
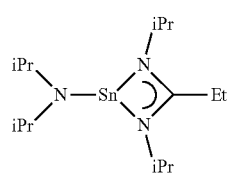
No. 39
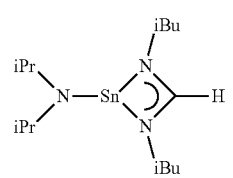
No. 40
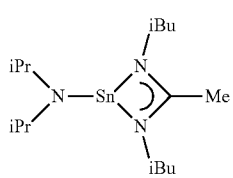
No. 41
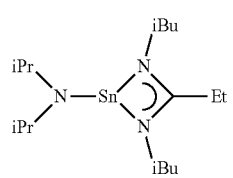
No. 42
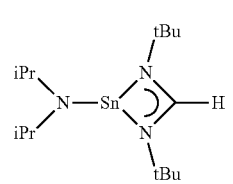
No. 43
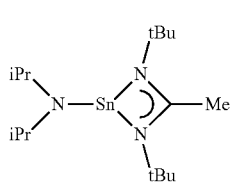
No. 44
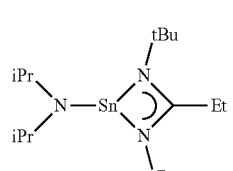
No. 45
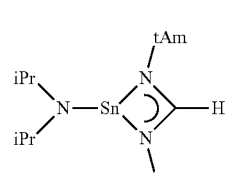
No. 46
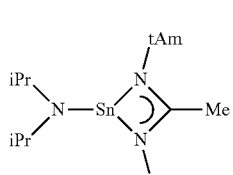
No. 47
-continued
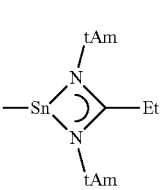
No. 48
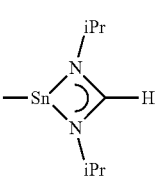
No. 49
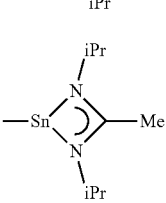
No. 50
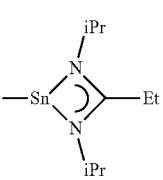
No. 51
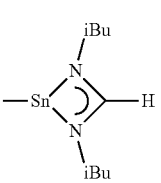
No. 52
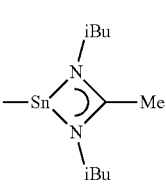
No. 53
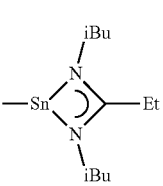
No. 54
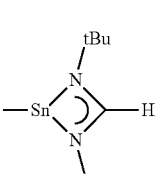
No. 55
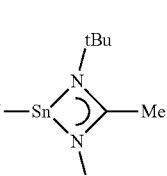
No. 56

-continued
No. 57
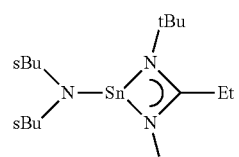
No. 58
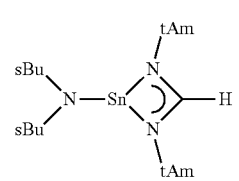
No. 59
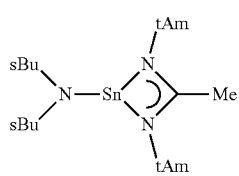
No. 60
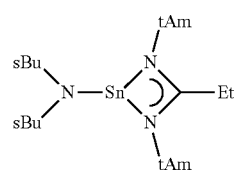
No. 61
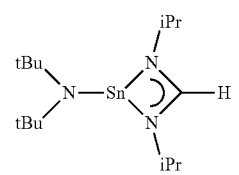
No. 62
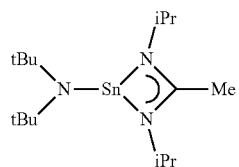
No. 63
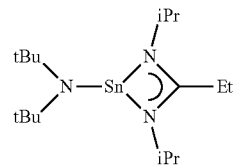
No. 64
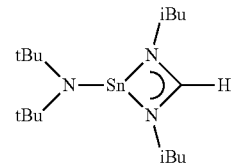
No. 65
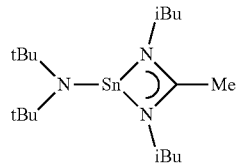
-continued
No. 66
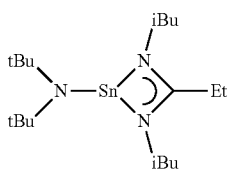
No. 67
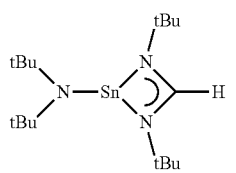
No. 68
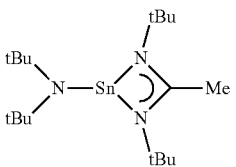
No. 69
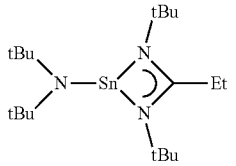
No. 70
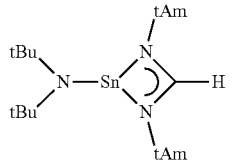
No. 71
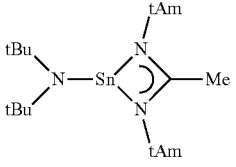
No. 72
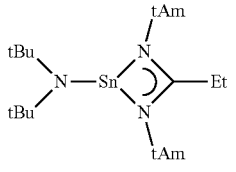
No. 73
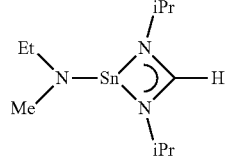
No. 74
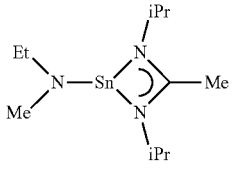

-continued
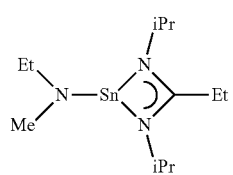
No. 75
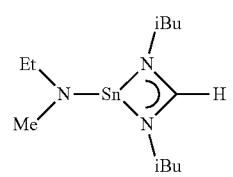
No. 76
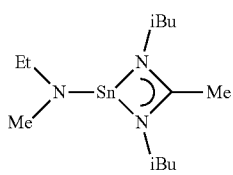
No. 77
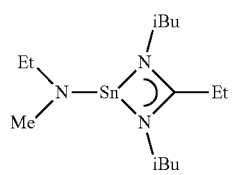
No. 78
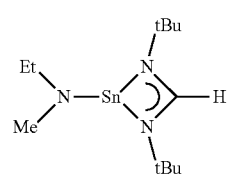
No. 79
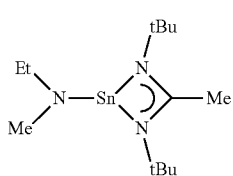
No. 80
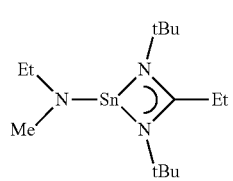
No. 81
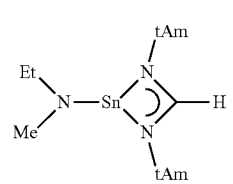
No. 82
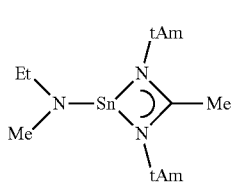
No. 83
-continued
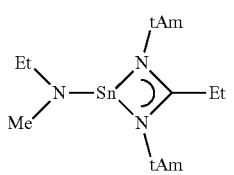
No. 84
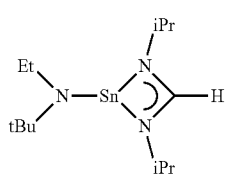
No. 85
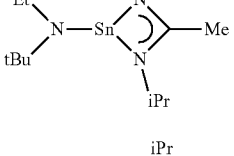
No. 86
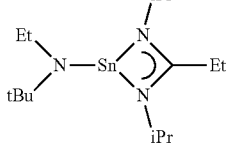
No. 87
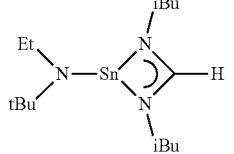
No. 88
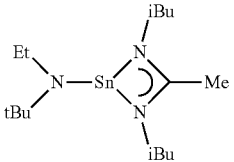
No. 89
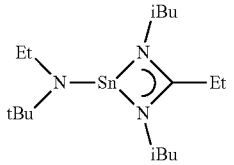
No. 90
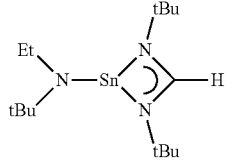
No. 91
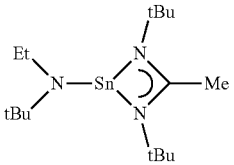
No. 92

| | |
|---|---|
| No. 93 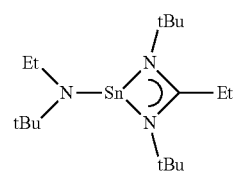 | No. 102 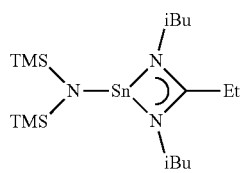 |
| No. 94 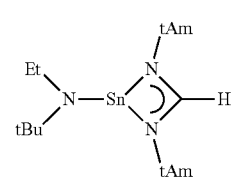 | No. 103 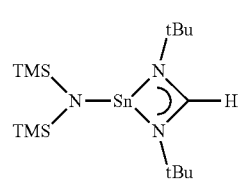 |
| No. 95 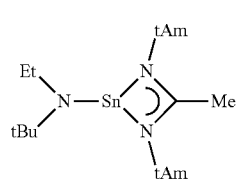 | No. 104 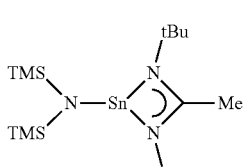 |
| No. 96 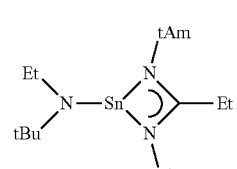 | No. 105 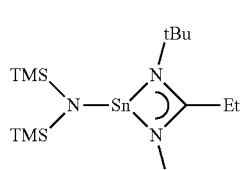 |
| No. 97 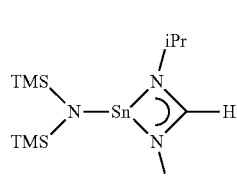 | No. 106 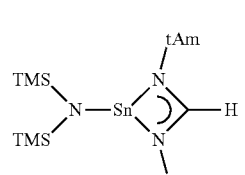 |
| No. 98 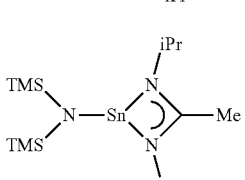 | No. 107 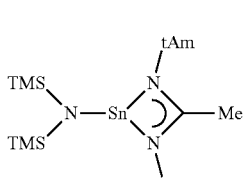 |
| No. 99 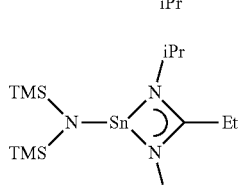 | No. 108 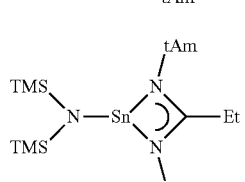 |
| No. 100 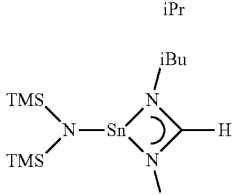 | No. 109 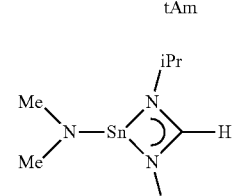 |
| No. 101 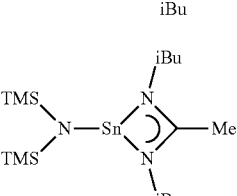 | No. 110 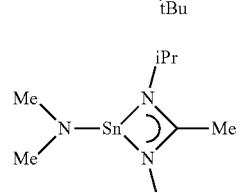 |

-continued

No. 111
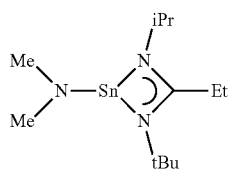

No. 112
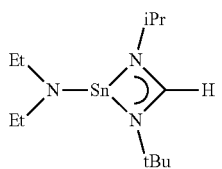

No. 113
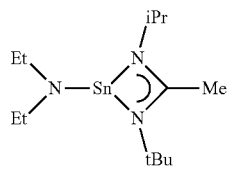

No. 114
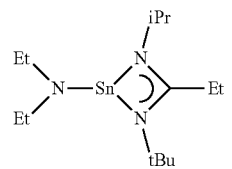

No. 115
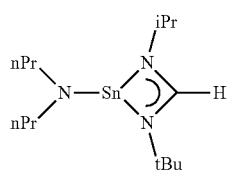

No. 116
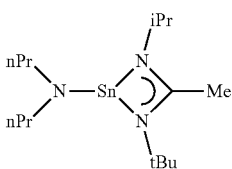

No. 117
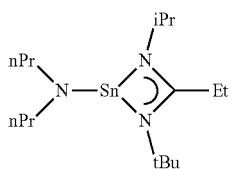

No. 118
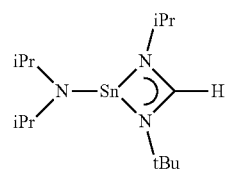

No. 119
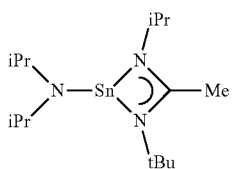

-continued

No. 120
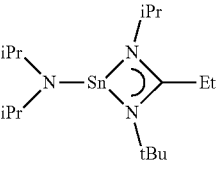

A method of producing the tin compound of the present invention is not particularly limited, and the compound may be produced by applying a well-known reaction. The tin compound of the present invention may be obtained by, for example, causing a halogen compound having a structure corresponding to the tin compound, an amine compound having a structure corresponding thereto, and an alkyllithium to react with each other in a n-hexane solvent, then filtering the resultant, evaporating the solvent from the resultant filtrate, and then purifying the residue by distillation.

Next, a thin-film forming raw material of the present invention is described. The thin-film forming raw material of the present invention contains the tin compound represented by the general formula (1) as a precursor of a thin-film. The form of the thin-film forming raw material of the present invention varies depending on a production process to which the thin-film forming raw material is applied. For example, when a thin-film containing only a tin atom as a metal is produced, the thin-film forming raw material of the present invention is free of a metal compound other than the tin compound represented by the general formula (1) and a semimetal compound. Meanwhile, when a thin-film containing two or more kinds of metals and/or a semimetal is produced, the thin-film forming raw material of the present invention may contain a compound containing a desired metal and/or a compound containing the semimetal (hereinafter sometimes referred to as "other precursor") in addition to the tin compound represented by the general formula (1). The thin-film forming raw material of the present invention may further contain an organic solvent and/or a nucleophilic reagent as described later. As described above, the physical properties of the tin compound represented by the general formula (1) serving as the precursor are suitable for a CVD method, and hence the thin-film forming raw material of the present invention is useful as a chemical vapor deposition raw material (hereinafter sometimes referred to as "CVD raw material"). Of those, the tin compound represented by the general formula (1) has an ALD window, and hence the thin-film forming raw material of the present invention is particularly suitable for an atomic layer deposition method.

When the thin-film forming raw material of the present invention is a CVD raw material, the form thereof is appropriately selected depending on a procedure such as a transportation and supply method of the CVD method to be used.

As the above-mentioned transportation and supply method, there are given a gas transportation method and a liquid transportation method. The gas transportation method involves vaporizing the CVD raw material through heating and/or decompression in a vessel in which the CVD raw material is stored (hereinafter sometimes referred to as "raw material vessel") to provide a raw material gas, and introducing the raw material gas into a film formation chamber (hereinafter sometimes referred to as "deposition reaction portion") having a substrate set therein together with a carrier gas, such as argon, nitrogen, or helium, to be used as required. The liquid transportation method involves transporting the CVD raw material to a vaporization chamber under the state of a liquid or a solution, vaporizing the CVD raw material through heating and/or decompression in the vaporization chamber to provide a raw material gas, and introducing the raw material gas into the film formation chamber. In the case of the gas transportation method, the very tin compound represented by the general formula (1) may be used as the CVD raw material. In the case of the liquid transportation method, the very tin compound represented by the general formula (1) or a solution obtained by dissolving the tin compound in an organic solvent may be used as the CVD raw material. Any such CVD raw material may further contain the other precursor, a nucleophilic reagent, and the like.

In addition, in a multi-component CVD method, there are given a method involving vaporizing and supplying the CVD raw material independently for each component (hereinafter sometimes referred to as "single source method"), and a method involving vaporizing and supplying a mixed raw material obtained by mixing a multi-component raw material with desired composition in advance (hereinafter sometimes referred to as "cocktail source method"). In the case of the cocktail source method, a mixture of the tin compound represented by the general formula (1) and the other precursor or a mixed solution obtained by dissolving the mixture in an organic solvent may be used as the CVD raw material. The mixture or the mixed solution may further contain a nucleophilic reagent and the like.

There is no particular limitation on the above-mentioned organic solvent, and a well-known and general organic solvent may be used. Examples of the organic solvent include: acetic acid esters, such as ethyl acetate, butyl acetate, and methoxyethyl acetate; ethers, such as tetrahydrofuran, tetrahydropyran, ethylene glycol dimethyl ether, diethylene glycol dimethyl ether, triethylene glycol dimethyl ether, dibutyl ether, and dioxane; ketones, such as methyl butyl ketone, methyl isobutyl ketone, ethyl butyl ketone, dipropyl ketone, diisobutyl ketone, methyl amyl ketone, cyclohexanone, and methylcyclohexanone; hydrocarbons, such as hexane, cyclohexane, methylcyclohexane, dimethylcyclohexane, ethylcyclohexane, heptane, octane, toluene, and xylene; hydrocarbons each having a cyano group, such as 1-cyanopropane, 1-cyanobutane, 1-cyanohexane, cyano-cyclohexane, cyanobenzene, 1,3-dicyanopropane, 1,4-dicyanobutane, 1,6-dicyanohexane, 1,4-dicyanocyclohexane, and 1,4-dicyanobenzene, and pyridine and lutidine. Those organic solvents may be used alone or as a mixture thereof depending on the solubility of a solute, a relationship among the use temperature, boiling point, and flash point of each of the solvents, and the like.

When the thin-film forming raw material of the present invention is a mixed solution with the above-mentioned organic solvent, the amount of the entire precursors in the thin-film forming raw material is preferably from 0.01 mol/liter to 2.0 mol/liter, more preferably from 0.05 mol/liter to 1.0 mol/liter from the viewpoint that a high-quality thin-film can be produced with high productivity.

When the thin-film forming raw material of the present invention is free of the other precursor other than the tin compound represented by the general formula (1), the amount of the entire precursors herein means the amount of the tin compound represented by the general formula (1). When the thin-film forming raw material of the present invention contains the other precursor in addition to the tin compound represented by the general formula (1), the amount of the entire precursors herein means the total amount of the tin compound represented by the general formula (1) and the other precursor.

In addition, in the case of the multi-component CVD method, there is no particular limitation on the other precursor to be used together with the tin compound represented by the general formula (1), and a well-known and general precursor used in the CVD raw material may be used.

Examples of the other precursor include compounds of one kind or two or more kinds selected from the group consisting of compounds used as organic ligands, such as an alcohol compound, a glycol compound, a β-diketone compound, a cyclopentadiene compound, and an organic amine compound, and silicon or a metal. Examples of the kind of the metal in the precursor include lithium, sodium, potassium, magnesium, calcium, strontium, barium, titanium, zirconium, hafnium, vanadium, tantalum, chromium, molybdenum, tungsten, manganese, iron, cobalt, rhodium, iridium, nickel, palladium, platinum, copper, silver, gold, zinc, aluminum, germanium, tin, lead, antimony, bismuth, yttrium, lanthanum, cerium, praseodymium, neodymium, promethium, samarium, europium, gadolinium, terbium, dysprosium, holmium, erbium, thulium, ytterbium, ruthenium, and lutetium.

Examples of the alcohol compound to be used as the organic ligand in the above-mentioned other precursor include: alkyl alcohols, such as methanol, ethanol, propanol, isopropyl alcohol, butanol, sec-butyl alcohol, isobutyl alcohol, tert-butyl alcohol, pentyl alcohol, isopentyl alcohol, and tert-pentyl alcohol; ether alcohols, such as 2-methoxyethanol, 2-ethoxyethanol, 2-butoxyethanol, 2-(2-methoxyethoxy)ethanol, 2-methoxy-1-methylethanol, 2-methoxy-1,1-dimethylethanol, 2-ethoxy-1,1-dimethylethanol, 2-isopropoxy-1,1-dimethylethanol, 2-butoxy-1,1-dimethylethanol, 2-(2-methoxyethoxy)-1,1-dimethylethanol, 2-propoxy-1,1-diethylethanol, 2-s-butoxy-1,1-diethylethanol, and 3-methoxy-1,1-dimethylpropanol, and dialkylamino alcohols, such as dimethylaminoethanol, ethylmethylaminoethanol, diethylaminoethanol, dimethylamino-2-pentanol, ethylmethylamino-2-pentanol, dimethylamino-2-methyl-2-pentanol, ethylmethylamino-2-methyl-2-pentanol, and diethylamino-2-methyl-2-pentanol.

Examples of the glycol compound to be used as the organic ligand in the above-mentioned other precursor include 1,2-ethanediol, 1,2-propanediol, 1,3-propanediol, 2,4-hexanediol, 2,2-dimethyl-1,3-propanediol, 2,2-diethyl-1,3-propanediol, 1,3-butanediol, 2,4-butanediol, 2,2-diethyl-1,3-butanediol, 2-ethyl-2-butyl-1,3-propanediol, 2,4-pentanediol, 2-methyl-1,3-propanediol, 2-methyl-2,4-pentanediol, 2,4-hexanediol, and 2,4-dimethyl-2,4-pentanediol.

Examples of the β-diketone compound to be used as the organic ligand in the above-mentioned other precursor include: alkyl-substituted β-diketones, such as acetylacetone, hexane-2,4-dione, 5-methylhexane-2,4-dione, heptane-2,4-dione, 2-methylheptane-3,5-dione, 5-methylheptane-2,4-dione, 6-methylheptane-2,4-dione, 2,2-dimethylheptane-3,5-dione, 2,6-dimethylheptane-3,5-dione, 2,2,6-trimethylheptane-3,5-dione, 2,2,6,6-tetramethylheptane-3,5-dione, octane-2,4-dione, 2,2,6-trimethyloctane-3,5-dione, 2,6-dimethyloctane-3,5-dione, 2,9-dimethylnonane-4,6-dione, 2-methyl-6-ethyldecane-3,5-dione, and 2,2-dimethyl-6-ethyldecane-3,5-dione; fluorine-substituted alkyl β-diketones, such as 1,1,1-trifluoropentane-2,4-dione, 1,1,1-trifluoro-5,5-dimethylhexane-2,4-dione, 1,1,1,5,5,5-hexafluoropentane-2,4-dione, and 1,3-diperfluorohexylpropane-1,3-dione, and ether-substituted β-diketones, such as 1,1,5,5-tetramethyl-1-methoxyhexane-2,4-dione, 2,2,6,6-tetramethyl-1-methoxyheptane-3,5-dione, and 2,2,6,6-tetramethyl-1-(2-methoxyethoxy)heptane-3,5-dione.

Examples of the cyclopentadiene compound to be used as the organic ligand in the above-mentioned other precursor include cyclopentadiene, methylcyclopentadiene, ethylcyclopentadiene, propylcyclopentadiene, isopropylcyclopentadiene, butylcyclopentadiene, sec-butylcyclopentadiene, isobutylcyclopentadiene, tert-butylcyclopentadiene, dimethylcyclopentadiene, and tetramethylcyclopentadiene.

Examples of the organic amine compound to be used as the organic ligand in the above-mentioned other precursor include methylamine, ethylamine, propylamine, isopropylamine, butylamine, sec-butylamine, tert-butylamine, isobutylamine, dimethylamine, diethylamine, dipropylamine, diisopropylamine, ethylmethylamine, propylmethylamine, and isopropylmethylamine.

The above-mentioned other precursors are known in the art, and production methods therefor are also known. An example of the production methods is given below. For example, when the alcohol compound is used as the organic ligand, the precursor may be produced through a reaction between an inorganic salt of the metal described above or a hydrate thereof and an alkali metal alkoxide of the alcohol compound. In this case, examples of the inorganic salt of the metal or the hydrate thereof may include a halide and a nitrate of the metal, and examples of the alkali metal alkoxide may include a sodium alkoxide, a lithium alkoxide, and a potassium alkoxide.

In the case of the single source method, a compound similar to the tin compound represented by the general formula (1) in the behavior of thermal decomposition and/or oxidative decomposition is preferably used as the above-mentioned other precursor. In the case of the cocktail source method, a compound that not only is similar to the tin compound represented by the general formula (1) in the behavior of thermal decomposition and/or oxidative decomposition but also does not cause any change impairing desired characteristics as a precursor through a chemical reaction or the like at the time of mixing is preferably used as the above-mentioned other precursor from the viewpoint of producing a high-quality thin-film with high productivity.

In addition, the thin-film forming raw material of the present invention may contain a nucleophilic reagent as required in order to improve the stability of the tin compound represented by the general formula (1) and the other precursor. Examples of the nucleophilic reagent include: ethylene glycol ethers, such as glyme, diglyme, triglyme, and tetraglyme; crown ethers, such as 18-crown-6, dicyclohexyl-18-crown-6, 24-crown-8, dicyclohexyl-24-crown-8, and dibenzo-24-crown-8, polyamines, such as ethylenediamine, N,N'-tetramethylethylenediamine, diethylenetriamine, triethylenetetramine, tetraethylenepentamine, pentaethylenehexamine, 1,1,4,7,7-pentamethyldiethylenetriamine, 1,1,4,7,10,10-hexamethyltriethylenetetramine, and triethoxytriethyleneamine; cyclic polyamines, such as cyclam and cyclen; heterocyclic compounds, such as pyridine, pyrrolidine, piperidine, morpholine, N-methylpyrrolidine, N-methylpiperidine, N-methylmorpholine, tetrahydrofuran, tetrahydropyran, 1,4-dioxane, oxazole, thiazole, and oxathiolane; β-keto esters, such as methyl acetoacetate, ethyl acetoacetate, and 2-methoxyethyl acetoacetate; and β-diketones, such as acetylacetone, 2,4-hexanedione, 2,4-heptanedione, 3,5-heptanedione, and dipivaloylmethane. From the viewpoint that a high-quality thin-film can be produced with high productivity, the usage amount of each of those nucleophilic reagents is preferably from 0.1 mol to 10 mol, more preferably from 1 mol to 4 mol with respect to 1 mol of the amount of the entire precursors.

The thin-film forming raw material of the present invention is prevented from containing impurity metal elements other than the components for forming the raw material, impurity halogens such as impurity chlorine, and impurity organic substances to the extent possible. The content of each of the impurity metal elements is preferably 100 ppb or less, more preferably 10 ppb or less, and the total content thereof is preferably 1 ppm or less, more preferably 100 ppb or less. In particular, when the raw material is used as a gate insulating film, a gate film, or a barrier layer of an LSI, it is required to reduce the contents of alkali metal elements and alkaline-earth metal elements that influence the electrical characteristics of a thin-film to be obtained. The content of the impurity halogens is preferably 100 ppm or less, more preferably 10 ppm or less, most preferably 1 ppm or less. The total content of the impurity organic substances is preferably 500 ppm or less, more preferably 50 ppm or less, most preferably 10 ppm or less. In addition, moisture causes generation of particles in the chemical vapor deposition raw material and generation of particles during thin-film formation. Accordingly, moisture in each of the precursor, the organic solvent, and the nucleophilic reagent is preferably removed as much as possible before its use. From the viewpoint that a high-quality thin-film can be produced with high productivity, the moisture content of each of the precursor, the organic solvent, and the nucleophilic reagent is preferably 10 ppm or less, more preferably 1 ppm or less.

In addition, it is preferred that the thin-film forming raw material of the present invention be prevented from containing particles to the extent possible in order to reduce or prevent particle contamination of a thin-film to be formed. Specifically, in particle measurement with a light scattering liquid particle detector in a liquid phase, it is preferred that the number of particles larger than 0.3 μm be 100 or less in 1 mL of the liquid phase, it is more preferred that the number of particles larger than 0.2 μm be 1,000 or less in 1 mL of the liquid phase, and it is most preferred that the number of particles larger than 0.2 μm be 100 or less in 1 mL of the liquid phase.

Next, a method of producing a thin-film including using the thin-film forming raw material of the present invention is described. The method of producing a thin-film of the present invention includes forming a thin-film containing a tin atom (hereinafter sometimes referred to as "tin-containing thin-film") on the surface of a substrate through use of a raw material gas obtained by vaporizing the thin-film forming raw material of the present invention. The method of producing a thin-film of the present invention preferably includes the steps of: introducing the raw material gas obtained by vaporizing the thin-film forming raw material of the present invention and a reactive gas to be used as required into a film formation chamber having the substrate set therein; and subjecting the tin compound represented by the general formula (1) in the raw material gas to decomposition and/or a chemical reaction, to thereby form the tin-containing thin-film on the surface of the substrate. The method of producing a thin-film of the present invention more preferably includes the steps of: causing the tin compound represented by the general formula (1) in the raw material gas to adsorb to (deposit on) the surface of the substrate, to thereby form a precursor thin-film; and causing the precursor thin-film to react with the reactive gas, to thereby form the tin-containing thin-film on the surface of the substrate. A transportation and supply method for the thin-film forming raw material, a method of forming the tin-containing thin-film and conditions for the formation, a production apparatus, and the like are not particularly limited, and well-known and general conditions and methods may be used.

Examples of the above-mentioned reactive gas to be used as required include: oxidizing gases, such as oxygen, ozone, and water vapor; reducing gases, such as a hydrocarbon compound, for example, methane or ethane, hydrogen, carbon monoxide, and an organic metal compound; and nitriding gases, such as an organic amine compound, for example, a monoalkylamine, a dialkylamine, a trialkylamine, or an alkylenediamine, hydrazine, and ammonia. Those reactive gases may be used alone or as a mixture thereof. The tin compound represented by the general formula (1) has such a property as to satisfactorily react with the oxidizing gas, and has such a property as to particularly satisfactorily react with oxygen, ozone, or water vapor. Accordingly, the oxidizing gas is preferably used as the reactive gas, and oxygen, ozone, or water vapor is more preferably used.

In addition, examples of the above-mentioned transportation and supply method include the gas transportation method, the liquid transportation method, the single source method, and the cocktail source method described above.

In addition, examples of the above-mentioned method of forming the tin-containing thin-film include: a thermal CVD method including causing a raw material gas to react only with heat or causing the raw material gas and a reactive gas to react only with heat, to thereby form a tin-containing thin-film; a plasma CVD method using heat and plasma; an optical CVD method using heat and light; an optical plasma CVD method using heat, light, and plasma; and an ALD method including dividing a deposition reaction of a CVD method into elementary steps, and performing deposition at a molecular level in a stepwise manner.

In addition, examples of the above-mentioned conditions for the formation of the tin-containing thin-film include a reaction temperature (substrate temperature), a reaction pressure, and a film formation rate. From the viewpoint that a high-quality thin-film can be produced with high productivity, the reaction temperature is preferably from room temperature to 500° C., more preferably from 100° C. to 300° C. In addition, from the viewpoint that a high-quality thin-film can be produced with high productivity, the reaction pressure is preferably from 10 Pa to an atmospheric pressure in the case of the thermal CVD method or the optical CVD method, and is preferably from 10 Pa to 2,000 Pa in the case of using plasma.

In addition, the film formation rate may be controlled by, for example, the supply conditions (vaporization temperature and vaporization pressure) of the thin-film forming raw material, the reaction temperature, and the reaction pressure. When the film formation rate is excessively high, the characteristics of a thin-film to be obtained may deteriorate. When the film formation rate is excessively low, a problem may occur in productivity. Accordingly, the film formation rate is preferably from 0.01 nm/min to 100 nm/min, more preferably from 1 nm/min to 50 nm/min. In addition, in the case of the ALD method, the film formation rate is controlled by the number of cycles so that a desired film thickness is obtained.

As other conditions, there are given a temperature and a pressure when the raw material gas is obtained by vaporizing the thin-film forming raw material. The step of obtaining the raw material gas by vaporizing the thin-film forming raw material may be performed in the raw material vessel or in the vaporization chamber. In any case, from the viewpoint that a high-quality thin-film can be produced with high productivity, it is preferred that the thin-film forming raw material of the present invention be evaporated at from 0° C. to 150° C. In addition, from the viewpoint that a high-quality thin-film can be produced with high productivity, when the raw material gas is obtained by vaporizing the thin-film forming raw material in the raw material vessel or in the vaporization chamber, the pressure in the raw material vessel and the pressure in the vaporization chamber are each preferably from 1 Pa to 10,000 Pa.

Examples of a material for the substrate include: silicon; ceramics, such as silicon nitride, titanium nitride, tantalum nitride, titanium oxide, ruthenium oxide, zirconium oxide, hafnium oxide, and lanthanum oxide; glass; and metals such as metal cobalt. Examples of the shape of the substrate include a plate shape, a spherical shape, a fibrous shape, and a scaly shape. The surface of the substrate may be planar, or may have a three-dimensional structure such as a trench structure.

The method of producing a thin-film of the present invention is preferably a method adopting the ALD method. Specifically, the method of producing a thin-film by the ALD method of the present invention preferably includes: a step (raw material introduction step) of introducing the raw material gas obtained by vaporizing the thin-film forming raw material into the film formation chamber having the substrate set therein; a step (precursor thin-film formation step) of causing the tin compound in the raw material gas to adsorb to (deposit on) the surface of the substrate, to thereby form a precursor thin-film; a step (evacuation step) of evacuating the unreacted raw material gas that has not adsorbed to (deposited on) the surface of the substrate; and a step (tin-containing thin-film formation step) of introducing the reactive gas into the film formation chamber, followed by causing the precursor thin-film to react with the reactive gas, to thereby form a tin-containing thin-film on the surface of the substrate. In addition, the method of producing a thin-film of the present invention preferably further includes a step (evacuation step) of evacuating the gas in the film formation chamber after the tin-containing thin-film formation step.

Now, regarding each step of the ALD method, the case of forming a tin oxide thin-film is described in detail as an example. First, the above-mentioned raw material introduction step is performed. A preferred temperature and pressure when the thin-film forming raw material is turned into the raw material gas are the same as those described above.

In the precursor thin-film formation step, the substrate may be heated, or the film formation chamber may be heated. From the viewpoint that a high-quality thin-film can be produced with high productivity, the temperature of the substrate is preferably from room temperature to 500° C., more preferably from 100° C. to 300° C. From the viewpoint that a high-quality thin-film can be produced with high productivity, the pressure of a system (the inside of the film formation chamber) when this step is performed is preferably from 1 Pa to 10,000 Pa, more preferably from 10 Pa to 1,000 Pa. When the thin-film forming raw material includes the other precursor in addition to the tin compound of the present invention, the other precursor is also deposited on the surface of the substrate together with the tin compound.

Next, the unreacted raw material gas that has not adsorbed to (deposited on) the surface of the substrate is evacuated from the film formation chamber. Although it is ideal that the unreacted raw material gas be completely evacuated from the film formation chamber, it is not always required that the gas be completely evacuated. A method for the evacuation is, for example, a method including purging the inside of the system with an inert gas, such as nitrogen, helium, or argon, a method including decompressing the inside of the system to evacuate the gas, or a combination of these methods. From the viewpoint that a high-quality thin-film can be produced with high productivity, a degree of decompression when the decompression is performed is preferably from 0.01 Pa to 300 Pa, more preferably from 0.01 Pa to 100 Pa.

Next, an oxidizing gas is introduced as the reactive gas into the film formation chamber, and the precursor thin-film is caused to react with the oxidizing gas through the action of the oxidizing gas or the action of the oxidizing gas and heat to form the tin oxide thin-film. From the viewpoint that a high-quality thin-film can be produced with high productivity, the temperature when this step is performed is preferably from room temperature to 500° C., more preferably from 100° C. to 300° C. From the viewpoint that a high-quality thin-film can be produced with high productivity, the pressure of the system (inside of the film formation chamber) when this step is performed is preferably from 1 Pa to 10,000 Pa, more preferably from 10 Pa to 1,000 Pa. The tin compound represented by the general formula (1) has satisfactory reactivity with the oxidizing gas, and hence a high-quality tin oxide thin-film containing a small amount of residual carbon can be obtained. Oxygen, ozone, or water vapor is preferably used as the oxidizing gas.

After the tin-containing thin-film formation step, to produce a high-quality thin-film, the unreacted oxidizing gas and a by-product gas are evacuated from the film formation chamber. Although it is ideal that the unreacted oxidizing gas and the by-product gas be completely evacuated from the film formation chamber, it is not always required that the gases be completely evacuated. The term "unreacted oxidizing gas" refers to the oxidizing gas that has not reacted with the precursor thin-film in the tin-containing thin-film formation step. In addition, the term "by-product gas" refers to a gas produced after the precursor thin-film has been caused to react with the oxidizing gas in the tin-containing thin-film formation step. A method for the evacuation and a degree of decompression when the decompression is performed are the same as those in the above-mentioned evacuation step.

When the ALD method is adopted as described above in the method of producing a thin-film of the present invention, the following may be performed: a series of operations consisting of the raw material introduction step, the precursor thin-film formation step, the evacuation step, the tin-containing thin-film formation step, and the evacuation step described above is defined as one cycle, and the cycle is repeated until a thin-film having a required thickness is obtained.

In addition, in the formation of the tin oxide thin-film by the ALD method, energy, such as plasma, light, or a voltage, may be applied, and a catalyst may be used. There are no particular limitations on the timing of the application of the energy and the timing of the use of the catalyst. The energy may be applied or the catalyst may be used, for example, at the time of the introduction of the raw material gas in the raw material introduction step, at the time of heating in the precursor thin-film formation step or the tin-containing thin-film formation step, at the time of the evacuation of the inside of the system in the evacuation step, or at the time of the introduction of the reactive gas in the tin-containing thin-film formation step, or between the above-mentioned respective steps.

In addition, in the method of producing a thin-film of the present invention, after the formation of the tin-containing thin-film, annealing treatment may be performed under an inert atmosphere, an oxidizing atmosphere, or a reducing atmosphere for obtaining more satisfactory electrical characteristics. In the case where step embedding is required, a reflow step may be included in the method. The temperature in this case is preferably from 200° C. to 1,000° C., and from the viewpoint that a high-quality thin-film can be produced with high productivity, the temperature is more preferably from 250° C. to 500° C.

Figure 2:
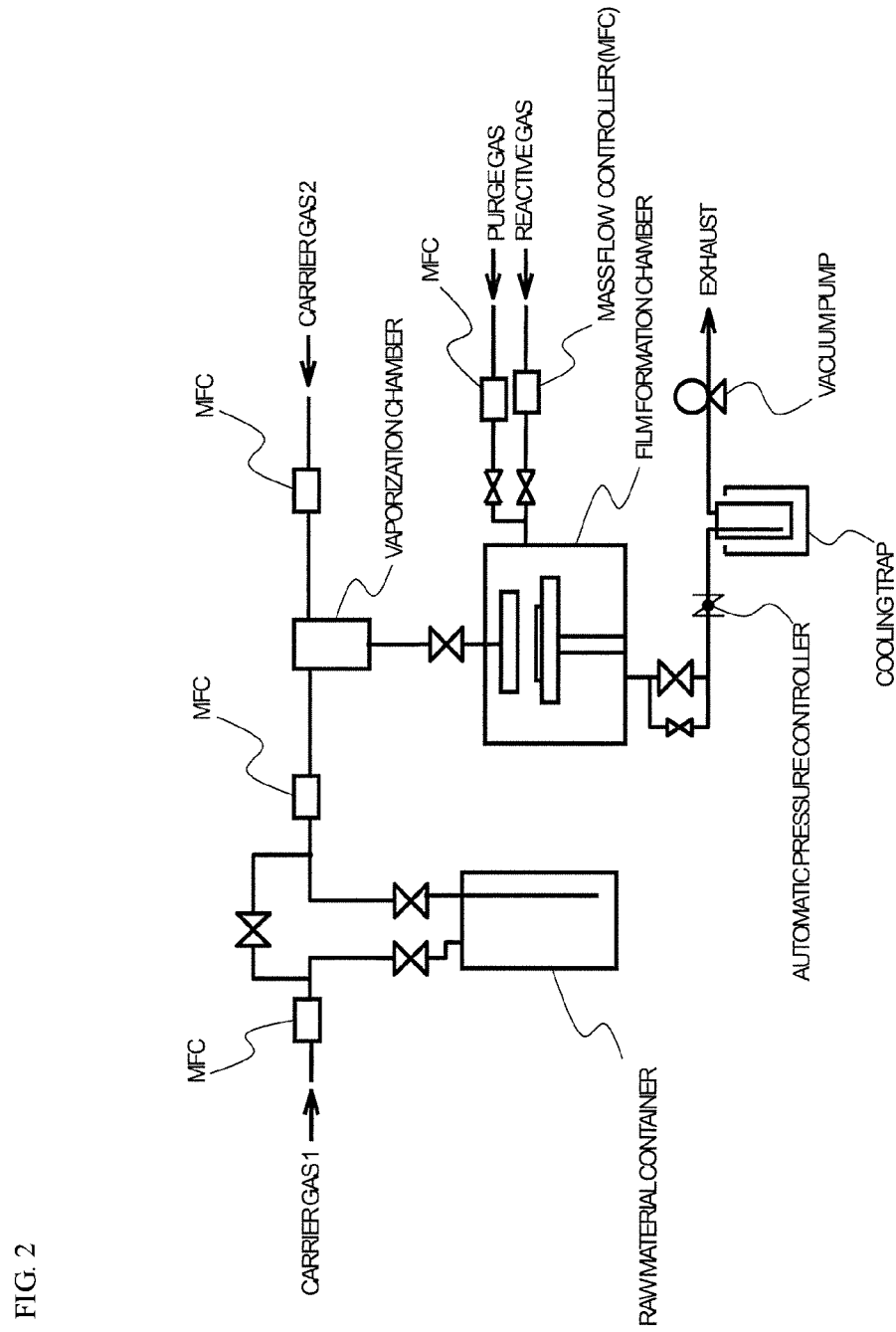
FIG. 2 is a schematic diagram for illustrating another example of the ALD apparatus to be used in the method of producing a thin-film according to the present invention.
Figure 3:
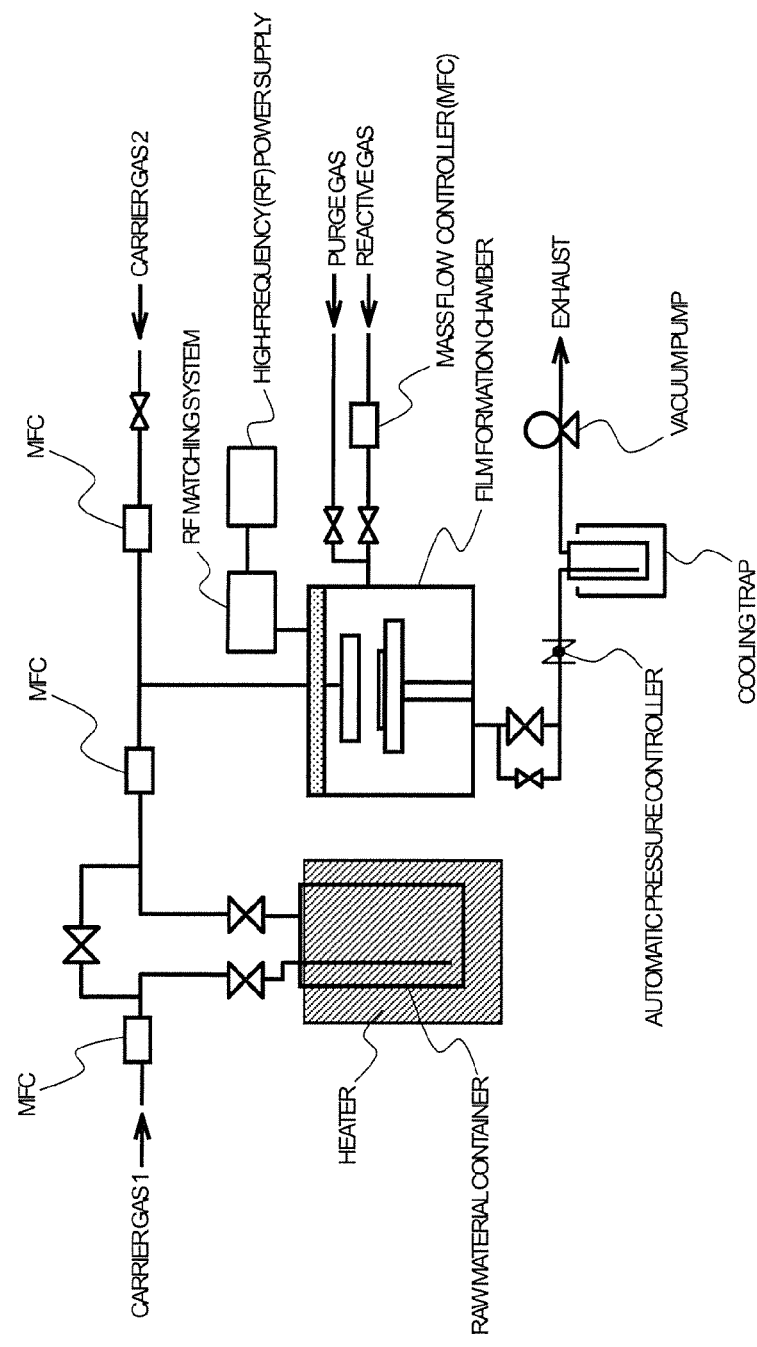
FIG. 3 is a schematic diagram for illustrating another example of the ALD apparatus to be used in the method of producing a thin-film according to the present invention.
Figure 4:
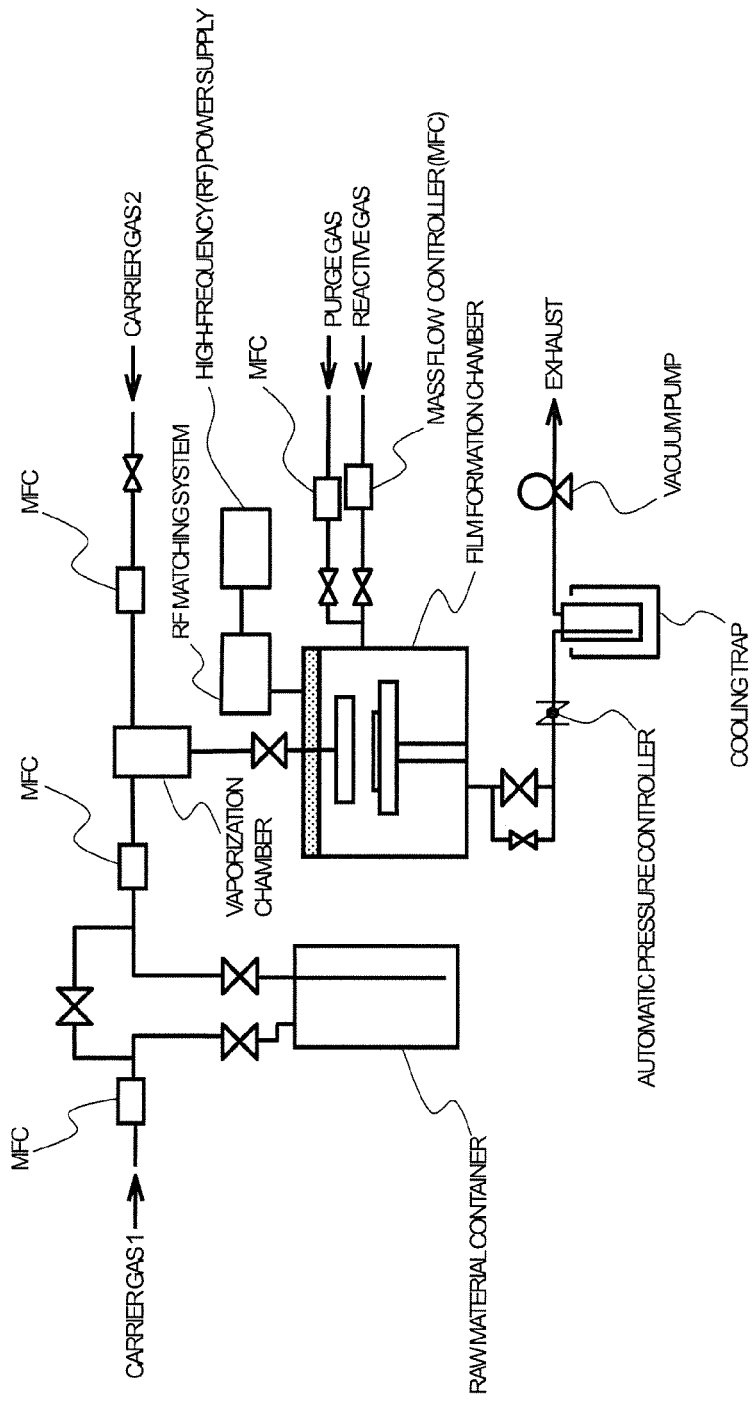
FIG. 4 is a schematic diagram for illustrating another example of the ALD apparatus to be used in the method of producing a thin-film according to the present invention.

An ALD apparatus to be used in the method of producing a thin-film of the present invention is, for example, an apparatus capable of performing bubbling supply of a precursor as illustrated in each of FIG. 1 and FIG. 3, or an apparatus including a vaporization chamber as illustrated in each of FIG. 2 and FIG. 4. An apparatus capable of subjecting the reactive gas to plasma treatment as illustrated in each of FIG. 3 and FIG. 4 is also permitted. The apparatus is not limited to such single-substrate type apparatus each including a film formation chamber as illustrated in FIG. 1 to FIG. 4, and an apparatus capable of simultaneously processing a large number of substrates through use of a batch furnace may be used. Those ALD apparatus may also be used as CVD apparatus.

A thin-film produced by using the thin-film forming raw material of the present invention may be formed as desired kinds of thin-films, such as thin-films of a metal, oxide ceramics, nitride ceramics, and glass, by appropriately selecting the other precursor, the reactive gas, and the production conditions. The thin-film is excellent in electrical characteristics, optical characteristics, and the like, and is hence applied to various usages. Examples thereof include a metal thin-film, a metal oxide thin-film, a metal nitride thin-film, an alloy thin-film, and a metal-containing composite oxide thin-film. Those thin-films have been widely used in the production of, for example, an electrode material for a memory element typified by a DRAM element, a resistance film, a diamagnetic film used for the recording layer of a hard disk, and a catalyst material for a polymer electrolyte fuel cell.

A halogen compound of the present invention is represented by the general formula (2), and is particularly suitable as a raw material for a precursor to be used in a method of producing a thin-film including a vaporization step such as a CVD method.

A halogen compound represented by the following general formula (4) is identical in meaning to the halogen compound represented by the general formula (2).

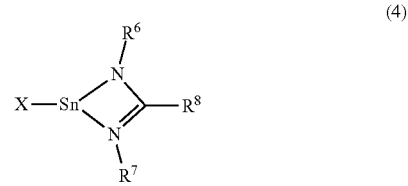

(4)

In the general formulae (2) and (4), X represents a halogen atom, $R^6$ and $R^7$ each independently represent an alkyl group having 1 to 5 carbon atoms, and $R^8$ represents a hydrogen atom or an alkyl group having 1 to 3 carbon atoms.

Examples of the "halogen atom" include a fluorine atom, a chlorine atom, a bromine atom, and an iodine atom.

Examples of the "alkyl group having 1 to 5 carbon atoms" include a methyl group, an ethyl group, a propyl group, an isopropyl group, a butyl group, an isobutyl group, a sec-butyl group, a tert-butyl group, a pentyl group, an isopentyl group, and a neopentyl group.

Examples of the "alkyl group having 1 to 3 carbon atoms" include a methyl group, an ethyl group, a propyl group, and an isopropyl group.

From the viewpoint that there is obtained a precursor that has high thermal stability, and enables high-productivity production of a high-quality thin-film when used as a thin-film forming raw material, $R^6$ and $R^7$ each independently represent preferably an alkyl group having 3 to 5 carbon atoms, more preferably a branched alkyl group having 3 to 5 carbon atoms, particularly preferably an isopropyl group or a tert-butyl group, most preferably a tert-butyl group. Although $R^6$ and $R^7$ may be identical to or different from each other, $R^6$ and $R^7$ preferably represent the same group from the viewpoint that there is obtained a precursor that has high thermal stability, and enables high-productivity production of a high-quality thin-film when used as a thin-film forming raw material. From the viewpoint that a precursor having high thermal stability and a large vapor pressure is obtained, $R^8$ represents preferably a hydrogen atom or an alkyl group having 1 or 2 carbon atoms, more preferably a methyl group or an ethyl group, particularly preferably a methyl group. From the viewpoint that the precursor can be produced with high productivity, X preferably represents a chlorine atom.

Preferred specific examples of the halogen compound represented by the general formula (2) include Halogen Compounds No. 121 to No. 135 below. In Halogen Compounds No. 121 to No. 135 below, "Me" represents a methyl group, "Et" represents an ethyl group, "iPr" represents an isopropyl group, and "tBu" represents a tert-butyl group.

No. 121

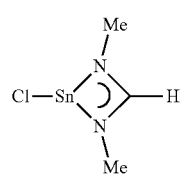

No. 122

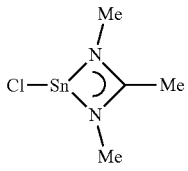

No. 123

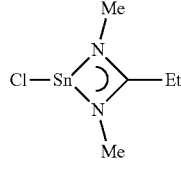

No. 124

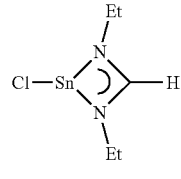

No. 125

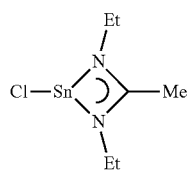

No. 126

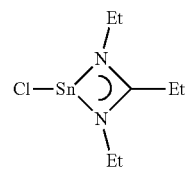

No. 127

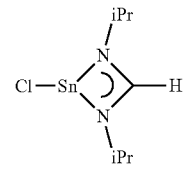

No. 128

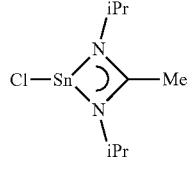

No. 129

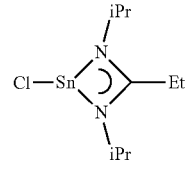

No. 130

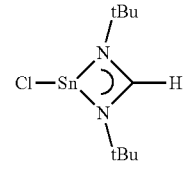

No. 131

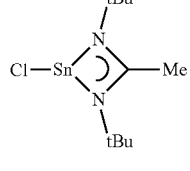

No. 132

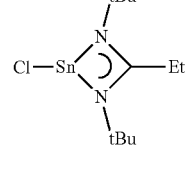

No. 133

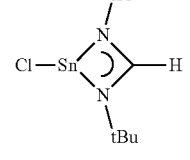

-continued

No. 134

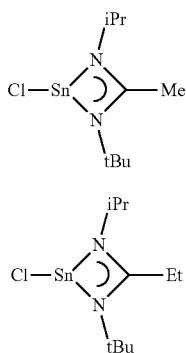

No. 135

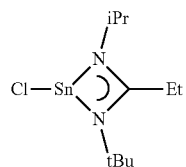

A method of producing the halogen compound of the present invention is not particularly limited, and the compound may be produced by applying a well-known reaction. The halogen compound of the present invention may be obtained by, for example, causing tin chloride, an amidine compound having a structure corresponding to the halogen compound, and an alkyllithium to react with each other in a n-hexane solvent, then filtering the resultant, evaporating the solvent from the resultant filtrate, and then purifying the residue by distillation.

The halogen compound of the present invention may be used as a raw material for a metal complex compound to be used in, for example, a thin-film forming raw material. In addition, the halogen compound of the present invention may be used in usages including: a solvent; a flavor; an agricultural chemical; a medicine; and synthetic raw materials for various polymers and the like.

EXAMPLES

Hereinafter, the present invention is described in more detail below by way of Examples, Comparative Examples, and Evaluation Examples. However, the present invention is by no means limited by Examples and the like below.
<Production of Halogen Compound>

The production results of halogen compounds are described in Examples 1 to 3 below.

Example 1

Production of Halogen Compound No. 131

35.2 Grams (0.186 mol) of tin chloride and 110.4 g of n-hexane were loaded into a 1-liter four-necked flask, and the mixture was stirred under room temperature. A solution prepared from 30.9 g (0.181 mol) of di-tert-butylacetamidine, 122.6 g of n-hexane, and 114 ml (0.181 mol) of n-butyllithium was dropped into the flask under ice cooling. After the dropping, the temperature of the mixture was returned to room temperature, and then the mixture was heated at a bath temperature of 50° C. for 3 hours. After that, the temperature of the mixture was returned to room temperature, and the mixture was stirred for 16 hours, followed by filtration. The solvent was removed from the resultant filtrate, and the residue was distilled at a bath temperature of 115° C., a pressure of 79 Pa, and a column top temperature of 95° C. to provide Halogen Compound No. 131 as a pale yellow solid in a yield of 49.6 g and a percent yield of 83%. The results of the normal pressure TG-DTA, reduced pressure TG-DTA, elemental analysis, and $^1$H-NMR analysis of the resultant halogen compound are described below.

(1) Normal Pressure TG-DTA

50% mass loss temperature: 216° C. (argon flow rate: 100 ml/min, temperature increase rate: 10° C./min, sample amount: 10.217 mg)

(2) Reduced Pressure TG-DTA

50% mass loss temperature: 126° C. (10 Torr, argon flow rate: 50 ml/min, temperature increase rate: 10° C./min, sample amount: 10.055 mg)

(3) Elemental Analysis (Metal Analysis: ICP-AES)

Tin content: 36.8 mass % (theoretical value: 36.7 mass %)

(4) $^1$H-NMR (Solvent: Deuterated Benzene) (Chemical Shift:Multiplicity:Number of Hs)

(1.04:s:18) (1.57:s:3)

Example 2

Production of Halogen Compound No. 134

20.0 Grams (0.105 mol) of tin chloride and 56.0 g of n-hexane were loaded into a 500-milliliter four-necked flask, and the mixture was stirred under room temperature. A solution prepared from 15.9 g (0.101 mol) of tert-butyl-isopropylacetamidine, 50.4 g of n-hexane, and 65 ml (0.101 mol) of n-butyllithium was dropped into the flask under ice cooling. After the dropping, the temperature of the mixture was returned to room temperature, and the mixture was stirred for 18 hours, followed by filtration. The solvent was removed from the resultant filtrate, and the residue was distilled at a bath temperature of 120° C., a pressure of 67 Pa, and a column top temperature of 93° C. to provide Halogen Compound No. 134 as a pale yellow solid in a yield of 26.3 g and a percent yield of 81%. The results of the normal pressure TG-DTA, reduced pressure TG-DTA, elemental analysis, and $^1$H-NMR analysis of the resultant halogen compound are described below.

(1) Normal Pressure TG-DTA

50% mass loss temperature: 204° C. (argon flow rate: 100 ml/min, temperature increase rate: 10° C./min, sample amount: 9.859 mg)

(2) Reduced Pressure TG-DTA

50% mass loss temperature: 118° C. (10 Torr, argon flow rate: 50 ml/min, temperature increase rate: 10° C./min, sample amount: 9.432 mg)

(3) Elemental Analysis (Metal Analysis: ICP-AES)

Tin content: 38.3 mass % (theoretical value: 38.4 mass %)

(4) $^1$H-NMR (Solvent: Deuterated Benzene) (Chemical Shift:Multiplicity:Number of Hs)

(0.90-0.91:d:6) (1.04:s:9) (1.37:s:3) (3.35-3.38:m:1)

Example 3

Production of Halogen Compound No. 132

15.0 Grams (0.079 mol) of tin chloride and 59.8 g of n-hexane were loaded into a 500-milliliter four-necked flask, and the mixture was stirred under room temperature. A solution prepared from 13.9 g (0.075 mol) of di-tert-butyl-propionamidine, 45.8 g of n-hexane, and 48 ml (0.075 mol) of n-butyllithium was dropped into the flask under ice cooling. After the dropping, the temperature of the mixture was returned to room temperature, and the mixture was stirred for 15 hours, followed by filtration. The solvent was removed from the resultant filtrate, and the residue was distilled at a bath temperature of 125° C., a pressure of 66 Pa, and a column top temperature of 99° C. to provide Halogen Compound No. 132 as a pale yellow solid in a yield of 21.2 g and a percent yield of 80%. The results of the normal pressure TG-DTA, reduced pressure TG-DTA, elemental analysis, and $^1$H-NMR analysis of the resultant halogen compound are described below.

(1) Normal Pressure TG-DTA

50% mass loss temperature: 223° C. (argon flow rate: 100 ml/min, temperature increase rate: 10° C./min, sample amount: 9.606 mg)

(2) Reduced Pressure TG-DTA

50% mass loss temperature: 134° C. (10 Torr, argon flow rate: 50 ml/min, temperature increase rate: 10° C./min, sample amount: 9.651 mg)

(3) Elemental Analysis (Metal Analysis: ICP-AES)

Tin content: 35.1 mass % (theoretical value: 35.2 mass %)

(4) $^1$H-NMR (Solvent: Deuterated Benzene) (Chemical Shift:Multiplicity:Number of Hs)

(0.91-0.95:t:3) (1.08:s:18) (1.88-1.94:q:2)

<Production of Tin Compound>

The production results of tin compounds are described in Examples 4 to 12 below.

Example 4

Production of Tin Compound No. 8

15.0 Grams (0.046 mol) of Halogen Compound No. 131 and 49.4 g of tetrahydrofuran were loaded into a 500-milliliter four-necked flask, and the mixture was stirred under room temperature. A solution prepared from 23.4 g (0.057 mol) of a solution of dimethylamine in tetrahydrofuran, 71.5 g of tetrahydrofuran, and 32 ml (0.050 mol) of n-butyllithium was dropped into the flask under ice cooling. After the dropping, the temperature of the mixture was returned to room temperature, and the mixture was stirred for 16 hours. The solvent was replaced with n-hexane, and then the resultant was filtered. The solvent was removed from the resultant filtrate, and the residue was distilled at a bath temperature of 100° C., a pressure of 68 Pa, and a column top temperature of 71° C. to provide Tin Compound No. 8 as a pale yellow liquid in a yield of 7.4 g and a percent yield of 48%. The results of the elemental analysis and $^1$H-NMR analysis of the resultant tin compound are described below.

(1) Elemental Analysis (Metal Analysis: ICP-AES)

Tin content: 35.6 mass % (theoretical value: 35.8 mass %)

(2) $^1$H-NMR (Solvent: Deuterated Benzene) (Chemical Shift:Multiplicity:Number of Hs)

(1.11:s:18) (1.68:s:3) (3.20:s:6)

Example 5

Production of Tin Compound No. 20

5.4 Grams (0.017 mol) of Halogen Compound No. 131 and 17.0 g of n-hexane were loaded into a 200-milliliter four-necked flask, and the mixture was stirred under room temperature. A solution prepared from 1.4 g (0.019 mol) of diethylamine, 14.7 g of n-hexane, and 12 ml (0.018 mol) of n-butyllithium was dropped into the flask under ice cooling. After the dropping, the temperature of the mixture was returned to room temperature, and the mixture was stirred for 18 hours, and the resultant was filtered. The solvent was removed from the resultant filtrate, and the residue was distilled at a bath temperature of 115° C., a pressure of 140 Pa, and a column top temperature of 83° C. to provide Tin Compound No. 20 as a pale yellow liquid in a yield of 3.4 g and a percent yield of 56%. The results of the elemental analysis and $^1$H-NMR analysis of the resultant tin compound are described below.

(1) Elemental Analysis (Metal Analysis: ICP-AES)

Tin content: 32.8 mass % (theoretical value: 33.0 mass %)

(2) $^1$H-NMR (Solvent: Deuterated Benzene) (Chemical Shift:Multiplicity:Number of Hs)

(1.15:s:18) (1.26-1.29:t:6) (1.69:s:3) (3.46-3.51:q:4)

Example 6

Production of Tin Compound No. 32

10.0 Grams (0.031 mol) of Halogen Compound No. 131 and 29.5 g of n-hexane were loaded into a 200-milliliter four-necked flask, and the mixture was stirred under room temperature. A solution prepared from 3.4 g (0.034 mol) of dipropylamine, 25.2 g of n-hexane, and 22 ml (0.034 mol) of n-butyllithium was dropped into the flask under ice cooling. After the dropping, the temperature of the mixture was returned to room temperature, and the mixture was stirred for 17 hours, followed by filtration. The solvent was removed from the resultant filtrate, and the residue was distilled at a bath temperature of 115° C., a pressure of 72 Pa, and a column top temperature of 85° C. to provide Tin Compound No. 32 as a pale yellow liquid in a yield of 8.0 g and a percent yield of 67%. The results of the elemental analysis and $^1$H-NMR analysis of the resultant tin compound are described below.

(1) Elemental Analysis (Metal Analysis: ICP-AES)

Tin content: 30.7 mass % (theoretical value: 30.6 mass %)

(2) $^1$H-NMR (Solvent: Deuterated Benzene) (Chemical Shift:Multiplicity:Number of Hs)

(0.97-1.01:t:6) (1.17:s:18) (1.66-1.71:m:7) (3.32-3.35:t:4)

Example 7

Production of Tin Compound No. 44

8.0 Grams (0.025 mol) of Halogen Compound No. 131 and 23.4 g of n-hexane were loaded into a 200-milliliter four-necked flask, and the mixture was stirred under room temperature. A solution prepared from 2.9 g (0.028 mol) of diisopropylamine, 27.4 g of n-hexane, and 17 ml (0.027 mol) of n-butyllithium was dropped into the flask under ice cooling. After the dropping, the temperature of the mixture was returned to room temperature, and the mixture was stirred for 22 hours, followed by filtration. The solvent was removed from the resultant filtrate, and the residue was distilled at a bath temperature of 125° C., a pressure of 60 Pa, and a column top temperature of 95° C. to provide Tin Compound No. 44 as a pale yellow solid in a yield of 5.5 g and a percent yield of 58%. The results of the elemental analysis and $^1$H-NMR analysis of the resultant tin compound are described below.

(1) Elemental Analysis (Metal Analysis: ICP-AES)

Tin content: 30.6 mass % (theoretical value: 30.6 mass %)

(2) $^1$H-NMR (Solvent: Deuterated Benzene) (Chemical Shift:Multiplicity:Number of Hs)

(1.19:s:18) (1.39-1.41:d:12) (1.71:s:3) (3.82-3.86:m:2)

Example 8

Production of Tin Compound No. 45

8.4 Grams (0.024 mol) of Halogen Compound No. 132 and 35.8 of n-hexane were loaded into a 200-milliliter four-necked flask, and the mixture was stirred under room temperature. A solution prepared from 2.8 g (0.028 mol) of diisopropylamine, 39.5 g of tetrahydrofuran, and 19 ml (0.027 mol) of n-butyllithium was dropped into the flask under ice cooling. After the dropping, the temperature of the mixture was returned to room temperature, and the mixture was stirred for 17 hours, followed by filtration. The solvent was removed from the resultant filtrate, and the residue was distilled at a bath temperature of 135° C., a pressure of 32 Pa, and a column top temperature of 83° C. to provide Tin Compound No. 45 as a pale yellow liquid in a yield of 7.8 g and a percent yield of 78%. The results of the elemental analysis and $^1$H-NMR analysis of the resultant tin compound are described below.

(1) Elemental Analysis (Metal Analysis: ICP-AES)

Tin content: 29.3 mass % (theoretical value: 29.5 mass %)

(2) $^1$H-NMR (Solvent: Deuterated Benzene) (Chemical Shift:Multiplicity:Number of Hs)

(1.03-1.07:t:3) (1.22:s:18) (1.39-1.40:d:12) (2.06-2.12:m:2) (3.80-3.86:m:2)

Example 9

Production of Tin Compound No. 56

7.8 Grams (0.024 mol) of Halogen Compound No. 131 and 30.5 g of n-hexane were loaded into a 200-milliliter four-necked flask, and the mixture was stirred under room temperature. A solution prepared from 3.3 g (0.025 mol) of di-sec-butylamine, 20.4 g of n-hexane, and 16 ml (0.025 mol) of n-butyllithium was dropped into the flask under ice cooling. After the dropping, the temperature of the mixture was returned to room temperature, and the mixture was stirred for 18 hours, followed by filtration. The solvent was removed from the resultant filtrate, and the residue was distilled at a bath temperature of 135° C., a pressure of 38 Pa, and a column top temperature of 91° C. to provide Tin Compound No. 56 as a pale yellow liquid in a yield of 6.4 g and a percent yield of 64%. The results of the elemental analysis and $^1$H-NMR analysis of the resultant tin compound are described below.

(1) Elemental Analysis (Metal Analysis: ICP-AES)

Tin content: 28.5 mass % (theoretical value: 28.5 mass %)

(2) $^1$H-NMR (Solvent: Deuterated Benzene) (Chemical Shift:Multiplicity:Number of Hs)

(1.00-1.04:t:6) (1.20:s:18) (1.34-1.39:m:6) (1.66-1.82:m:7) (3.40-3.45:m:2)

Example 10

Production of Tin Compound No. 92

10.3 Grams (0.032 mol) of Halogen Compound No. 131 and 52.9 g of n-hexane were loaded into a 200-milliliter four-necked flask, and the mixture was stirred under room temperature. A solution prepared from 3.7 g (0.037 mol) of ethyl-tert-butylamine, 50.3 g of n-hexane, and 22 ml (0.034 mol) of n-butyllithium was dropped into the flask under ice cooling. After the dropping, the temperature of the mixture was returned to room temperature, and the mixture was stirred for 18 hours, followed by filtration. The solvent was removed from the resultant filtrate, and the residue was distilled at a bath temperature of 115° C., a pressure of 63 Pa, and a column top temperature of 88° C. to provide Tin Compound No. 92 as a yellow liquid in a yield of 5.6 g and a percent yield of 46%. The results of the elemental analysis and $^1$H-NMR analysis of the resultant tin compound are described below.

(1) Elemental Analysis (Metal Analysis: ICP-AES)

Tin content: 30.5 mass % (theoretical value: 30.6 mass %)

(2) $^1$H-NMR (Solvent: Deuterated Benzene) (Chemical Shift:Multiplicity:Number of Hs)

(1.19:s:18) (1.31-1.35:t:3) (1.50:s:9) (1.72:s:3) (3.44-3.49:q:2)

Example 11

Production of Tin Compound No. 104

30.1 Grams (0.068 mol) of bis(trimethylsilylamido)tin and 71.9 g of n-hexane were loaded into a 300-milliliter four-necked flask, and the mixture was stirred under room temperature. 13.1 Grams (0.077 mol) of tert-butylacetamidine was dropped into the flask under ice cooling. After the dropping, the temperature of the mixture was returned to room temperature, and the mixture was stirred for 18 hours. After that, the solvent was removed, and the residue was distilled at a bath temperature of 130° C., a pressure of 44 Pa, and a column top temperature of 91° C. to provide Tin Compound No. 104 as a pale yellow liquid in a yield of 27.5 g and a percent yield of 90%. The results of the elemental analysis and $^1$H-NMR analysis of the resultant tin compound are described below.

(1) Elemental Analysis (Metal Analysis: ICP-AES)

Tin content: 26.6 mass % (theoretical value: 26.5 mass %)

(2) $^1$H-NMR (Solvent: Deuterated Benzene) (Chemical Shift:Multiplicity:Number of Hs)

(0.46:s:18) (1.16:s:18) (1.61:s:3)

Example 12

Production of Tin Compound No. 119

10.0 Grams (0.032 mol) of Halogen Compound No. 134 and 32.1 g of n-hexane were loaded into a 200-milliliter four-necked flask, and the mixture was stirred under room temperature. A solution prepared from 3.5 g (0.034 mol) of diisopropylamine, 25.8 g of n-hexane, and 23 ml (0.035 mol) of n-butyllithium was dropped into the flask under ice cooling. After the dropping, the temperature of the mixture was returned to room temperature, and the mixture was stirred for 15 hours, followed by filtration. The solvent was removed from the resultant filtrate, and the residue was distilled at a bath temperature of 110° C., a pressure of 63 Pa, and a column top temperature 82° C. to provide Tin Compound No. 119 as a pale yellow liquid in a yield of 6.8 g and a percent yield of 56%. The results of the elemental analysis and $^1$H-NMR analysis of the resultant tin compound are described below.

(1) Elemental Analysis (Metal Analysis: ICP-AES)

Tin content: 31.5 mass % (theoretical value: 31.7 mass %)

(2) $^1$H-NMR (Solvent: Deuterated Benzene) (Chemical Shift:Multiplicity:Number of Hs)

(1.02-1.04:d:3) (1.08-1.10:d:3) (1.19:s:9) (1.39-1.41:d:12) (1.53:s:3) (3.38-3.45:m:1) (3.84-3.91:m:2)

Evaluation Example

The tin compounds of the present invention obtained in Examples 4 to 12, and Comparative Compounds 1 and 2 below were subjected to the following evaluations. In Comparative Compounds 1 and 2 below, "Me" represents a methyl group, "iPr" represents an isopropyl group, and "tBu" represents a tert-butyl group.

(1) Melting Point Evaluation

The state of each of the compounds at 20° C. was visually observed. When the compound was a solid at 20° C., its melting point was measured with a minute melting point-measuring device. A compound having a low melting point is excellent in transportability, and hence can be judged to be preferred as a thin-film forming raw material. A compound that is in a liquid state at 20° C. is particularly excellent in transportability, and hence can be judged to be particularly preferred as a thin-film forming raw material. The results are shown in Table 1.

(2) Temperature (° C.) at the Time of 50 mass % Loss in Normal Pressure TG-DTA

The weight of a test compound was measured with a TG-DTA under normal pressure at an argon flow rate of 100 mL/min and a temperature increase rate of 10° C./min in the scanning temperature range of from 30° C. to 600° C., and the temperature (° C.) at which the weight of the test compound reduced by 50 mass % was evaluated as a "temperature (° C.) at the time of a 50 mass % loss in normal pressure TG-DTA." A compound having a low temperature at the time of a 50 mass % loss in normal pressure TG-DTA has a large vapor pressure, and hence can be judged to be preferred as a thin-film forming raw material. The results are shown in Table 1.

(3) Temperature (° C.) at the Time of 50 mass % Loss in Reduced Pressure TG-DTA

The weight of a test compound was measured with a TG-DTA at 10 Torr at an argon flow rate of 50 mL/min and a temperature increase rate of 10° C./min in the scanning temperature range of from 30° C. to 600° C., and the temperature (° C.) at which the weight of the test compound reduced by 50 mass % was evaluated as a "temperature (° C.) at the time of a 50 mass % loss in reduced pressure TG-DTA." A compound having a low temperature at the time of a 50 mass % loss in reduced pressure TG-DTA has a large vapor pressure, and hence can be judged to be preferred as a thin-film forming raw material. The results are shown in Table 1.

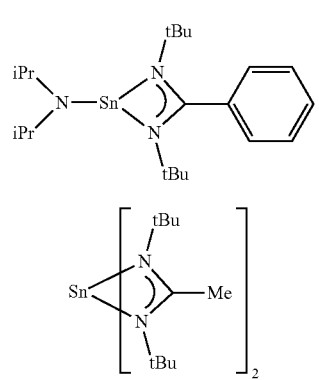

Comparative Compoud 1

Comparative Compoud 2

TABLE 1

| Tin compound | | State at 20° C. | Melting point [° C.] | Temperature at time of 50 mass % loss in normal pressure TG-DTA [° C.] | Temperature at time of 50 mass % loss in reduced pressure TG-DTA [° C.] |
|---|---|---|---|---|---|
| Evaluation Example 1 | No. 8 | Liquid | — | 176 | 93 |
| Evaluation Example 2 | No. 20 | Liquid | — | 188 | 107 |
| Evaluation Example 3 | No. 32 | Liquid | — | 207 | 119 |
| Evaluation Example 4 | No. 44 | Solid | 89 | 204 | 120 |
| Evaluation Example 5 | No. 45 | Liquid | — | 212 | 125 |
| Evaluation Example 6 | No. 56 | Liquid | — | 220 | 135 |
| Evaluation Example 7 | No. 92 | Liquid | — | 207 | 124 |
| Evaluation Example 8 | No. 104 | Liquid | — | 216 | 134 |
| Evaluation Example 9 | No. 119 | Liquid | — | 197 | 112 |
| Comparative Evaluation Example 1 | Comparative Compound 1 | Solid | 102 | 244 | 155 |
| Comparative Evaluation Example 2 | Comparative Compound 2 | Solid | 135 | 243 | 156 |

As shown in Table 1, it was found that the tin compounds of the present invention obtained in Examples 4 to 12 had melting points lower than those of Comparative Compounds 1 and 2. In addition, it was found that the tin compounds of the present invention obtained in Examples 4 to 12 each had a temperature at the time of a 50 mass % loss in normal pressure TG-DTA and a temperature at the time of a 50 mass % loss in reduced pressure TG-DTA, each of which was lower than those of Comparative Examples 1 and 2 by 20° C. or more. It was found that Tin Compounds No. 8, No. 20, No. 32, No. 44, No. 45, No. 92, and No. 119 out of the compounds each had a temperature at the time of a 50 mass % loss in normal pressure TG-DTA and a temperature at the time of a 50 mass % loss in reduced pressure TG-DTA, each of which was lower than those of Comparative Examples 1 and 2 by 30° C. or more.

Examples 13 to 21, and Comparative Examples 1 and 2

Production of Tin Oxide Thin-films by ALD Method

A tin oxide thin-film was produced on a silicon substrate by an ALD method under the following conditions through use of: each of the tin compounds of the present invention obtained in Examples 4 to 12, and Comparative Compounds 1 and 2 serving as a CVD raw material; and an ALD apparatus illustrated in FIG. 1. The thickness of the resultant thin-film was measured by an X-ray reflectivity method, the compound of the thin-film was identified by an X-ray diffraction method, and the amount of residual carbon in the thin-film was measured by X-ray photoelectron spectroscopy. The results are shown in Table 2.

(Conditions)

Reaction temperature (substrate temperature): 150° C.

Reactive gas: water vapor (Steps)

A series of steps consisting of the following steps (1) to (4) was defined as one cycle, and the cycle was repeated 800 times:

(1) the vapor of the chemical vapor deposition raw material vaporized under the conditions of a raw material vessel heating temperature of 90° C. and a raw material vessel internal pressure of 100 Pa is introduced into a reaction system, and the raw material is deposited at a system pressure of 100 Pa for 20 seconds;

(2) the unreacted raw material is removed through argon purging for 15 seconds;

(3) the reactive gas is introduced into the system, and is caused to react with the deposited raw material at a system pressure of 100 Pa for 1 second; and (4) the unreacted raw material is removed through argon purging for 90 seconds.

TABLE 2

|  | CVD raw material | Thickness of thin-film | Compound of thin-film | Amount of residual carbon in thin-film |
|---|---|---|---|---|
| Example 13 | No. 8 | 11.2 nm | Tin oxide | Undetectable*[1] |
| Example 14 | No. 20 | 13.2 nm | Tin oxide | Undetectable*[1] |
| Example 15 | No. 32 | 13.5 nm | Tin oxide | Undetectable*[1] |
| Example 16 | No. 44 | 15.8 nm | Tin oxide | Undetectable*[1] |
| Example 17 | No. 45 | 11.5 nm | Tin oxide | Undetectable*[1] |
| Example 18 | No. 56 | 10.9 nm | Tin oxide | Undetectable*[1] |
| Example 19 | No. 92 | 10.0 nm | Tin oxide | Undetectable*[1] |
| Example 20 | No. 104 | 9.0 nm | Tin oxide | Undetectable*[1] |
| Example 21 | No. 119 | 11.8 nm | Tin oxide | Undetectable*[1] |
| Comparative Example 1 | Comparative Compound 1 | 6.0 nm | Tin oxide | 7 atm % |
| Comparative Example 2 | Comparative Compound 2 | 6.5 nm | Tin oxide | 5 atm % |

*[1]The detection limit is 0.1 atm %.

As shown in Table 2, in each of Comparative Examples 1 and 2 in which Comparative Compounds 1 and 2 were used as CVD raw materials, the amount of residual carbon in the tin oxide thin-film was 5 atm % or more. In contrast, in each of Examples 13 to 21 in which the tin compounds of the present invention were used as CVD raw materials, the amount of residual carbon in the tin oxide thin-film was less than 0.1 atm % that was the detection limit. That is, it was shown that the use of the tin compound of the present invention provided a high-quality tin oxide thin-film.

In addition, as shown in Table 2, in each of Comparative Examples 1 and 2, the thickness of the thin-film to be obtained was 6.5 nm or less. In contrast, in each of Examples 13 to 21, the thickness of the thin-film to be obtained was 9.0 nm or more. That is, it was shown that the use of the tin compound of the present invention provided a tin oxide thin-film with high productivity. When each of Tin Compounds No. 20, No. 32, and No. 44 out of the compounds was used as a CVD raw material, a tin oxide thin-film was able to be obtained with higher productivity. Accordingly, it was shown that those tin compounds were more excellent as CVD raw materials. When Tin Compound No. 44 out of those compounds was used as a CVD raw material, a tin oxide thin-film was able to be obtained with extremely high productivity. Accordingly, it was shown that Tin Compound No. 44 was particularly excellent as a CVD raw material.

The invention claimed is:

1. A tin compound, which is represented by the following general formula (1):

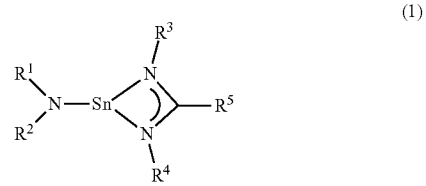

in the formula (1), $R^1$ and $R^2$ each independently represent an alkyl group having 1 to 5 carbon atoms or an alkylsilyl group having 3 to 12 carbon atoms, $R^3$ and $R^4$ each independently represent an alkyl group having 1 to 5 carbon atoms, and $R^5$ represents a hydrogen atom or an alkyl group having 1 to 5 carbon atoms.

2. A thin-film forming raw material, comprising the tin compound of claim 1.

3. A thin-film, which is obtained by using the thin-film forming raw material of claim 2.

4. A method of producing a thin-film, comprising forming a thin-film containing a tin atom on a surface of a substrate through use of a raw material gas obtained by vaporizing the thin-film forming raw material of claim 2.

5. The method of producing the thin-film according to claim 4, the method comprising:
   introducing the raw material gas obtained by vaporizing the thin-film forming raw material into a film formation chamber having the substrate set therein; and
   subjecting the tin compound in the raw material gas to decomposition and/or a chemical reaction, to thereby form the thin-film containing a tin atom on the surface of the substrate.

6. The method of producing the thin-film according to claim 5, the method further comprising:
   causing the tin compound in the raw material gas to adsorb to the surface of the substrate, to thereby form a precursor thin-film; and
   causing the precursor thin-film to react with a reactive gas, to thereby form the thin-film containing a tin atom on the surface of the substrate.

* * * * *